(12) United States Patent
Nakayama et al.

(10) Patent No.: US 12,133,532 B2
(45) Date of Patent: Nov. 5, 2024

(54) FOOD DOUGH FORMING DEVICE

(71) Applicant: RHEON AUTOMATIC MACHINERY CO., LTD., Tochigi (JP)

(72) Inventors: Atsuo Nakayama, Tochigi (JP); Mikio Narabu, Tochigi (JP); Susumu Kominato, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 239 days.

(21) Appl. No.: 17/781,555

(22) PCT Filed: Nov. 30, 2020

(86) PCT No.: PCT/JP2020/044426
§ 371 (c)(1),
(2) Date: Jun. 1, 2022

(87) PCT Pub. No.: WO2021/112026
PCT Pub. Date: Jun. 10, 2021

(65) Prior Publication Data
US 2022/0408735 A1    Dec. 29, 2022

(30) Foreign Application Priority Data

Dec. 2, 2019  (JP) .................................. 2019-218222

(51) Int. Cl.
*A21C 3/02* (2006.01)
*A21C 5/08* (2006.01)

(52) U.S. Cl.
CPC .............. *A21C 3/025* (2013.01); *A21C 3/024* (2013.01); *A21C 5/08* (2013.01)

(58) Field of Classification Search
CPC .. A21C 5/08; A21C 3/02; A21C 3/021; A21C 3/024; A21C 3/025; A21C 3/027;
(Continued)

(56) References Cited

U.S. PATENT DOCUMENTS

| | | | |
|---|---|---|---|
| 1,270,096 A | * | 6/1918 | Baker ....................... A21C 3/02 |
| | | | 425/371 |
| 2,534,296 A | * | 12/1950 | Pike ........................ B29C 43/24 |
| | | | 425/DIG. 235 |

(Continued)

FOREIGN PATENT DOCUMENTS

| | | | |
|---|---|---|---|
| AT | 520460 A1 * | 4/2019 | ............... A21C 3/02 |
| CA | 2488742 A1 | 12/2003 | |

(Continued)

OTHER PUBLICATIONS

NPL Machine English translation of Hierzenberger et a. (EP-4003024-B1) (Year: 2018).*

(Continued)

*Primary Examiner* — Jeffrey M Wollschlager
*Assistant Examiner* — Edgaredmanuel Troche
(74) *Attorney, Agent, or Firm* — Dilworth & Barrese, LLP

(57) ABSTRACT

In a food dough forming device according to the present invention, a dough forming flow path is formed to be enclosed between at least two rotatable rollers and between two wall plates. At least one of the at least two rotatable rollers is at least one long rotatable roller (31A, 32A). At least one remaining rotatable roller is at least one short rotatable roller (33A, 31B, 32B, 33B). A far-side wall plate (53) of the two wall plates has a fitting recess (53A, 53B) into which an arc portion of a periphery of the long rotatable roller is fitted, and a recessed cutout (53C, 53D, 53E, 53F) at the rotational shaft for the short rotatable roller. The short (Continued)

rotatable roller is fitted onto the rotational shaft for the short rotatable roller to abut the far-side wall plate. The nearside wall plate is disposed to abut the short rotatable roller. An axial movement of the short rotatable roller is limited by the two wall plates.

10 Claims, 21 Drawing Sheets

(58) Field of Classification Search
CPC ........... A21C 3/028; A21C 3/04; A21C 3/065; A21C 3/10; B29D 7/01; B29D 30/28
USPC ................ 7/111; 426/516; 366/76.5; 429/14; 425/335, 363, 367, 368
See application file for complete search history.

(56) References Cited

U.S. PATENT DOCUMENTS

| | | | | |
|---|---|---|---|---|
| 2,814,260 | A * | 11/1957 | Morgan | A21C 3/04 |
| | | | | 425/363 |
| 3,354,843 | A * | 11/1967 | Da | A21C 3/06 |
| | | | | 425/374 |
| 2003/0185927 | A1 * | 10/2003 | Morikawa | A21C 3/025 |
| | | | | 425/363 |
| 2004/0065210 | A1 * | 4/2004 | Hayashi | A21C 3/027 |
| | | | | 99/331 |
| 2009/0321473 | A1 * | 12/2009 | Schmidt | A21C 3/04 |
| | | | | 222/1 |
| 2010/0173052 | A1 * | 7/2010 | Suski | A21C 5/003 |
| | | | | 425/294 |
| 2011/0311698 | A1 * | 12/2011 | Morris | A21C 3/02 |
| | | | | 426/502 |
| 2015/0099049 | A1 * | 4/2015 | Harada | A21C 3/08 |
| | | | | 425/319 |
| 2015/0110930 | A1 * | 4/2015 | Morikawa | A21C 9/085 |
| | | | | 425/140 |
| 2020/0045984 | A1 * | 2/2020 | Stelzer | A21C 3/02 |

FOREIGN PATENT DOCUMENTS

| | | | | |
|---|---|---|---|---|
| EP | 0740902 | A2 | 11/1996 | |
| EP | 1174032 | A1 | 1/2002 | |
| EP | 4003024 | B1 * | 11/2023 | ............... A21C 3/02 |
| JP | S36-018083 | B | 10/1961 | |
| JP | 3056697 | B2 * | 6/2000 | |
| JP | 2000342160 | A | 12/2000 | |
| JP | 2003061561 | A | 3/2003 | |
| JP | 6076338 | A1 | 2/2017 | |
| JP | 6076338 | B2 * | 2/2017 | ............. A21C 11/10 |
| WO | WO-2018071948 | A1 * | 4/2018 | ............. A21C 11/16 |
| WO | WO-2019056039 | A1 * | 3/2019 | ............... A21C 3/02 |

OTHER PUBLICATIONS

WO-2019056039-A1 FOR and Translation doc. (Year: 2019).*
WO-2018071948-A1 FOR and Translation doc. (Year: 2018).*
JP-3056697-B2 FOR and Translation doc. (Year: 2000).*
AT-520460-A1 FOR and Translation doc. (Year: 2017).*
JP-6076338-B2 FOR and Translation doc. (Year: 2017).*
Written Opinion of International Search Report and translation of International Search Report, JPRO, Apr. 14, 2020.
Extended European Search Report dated Dec. 7, 2023.

* cited by examiner

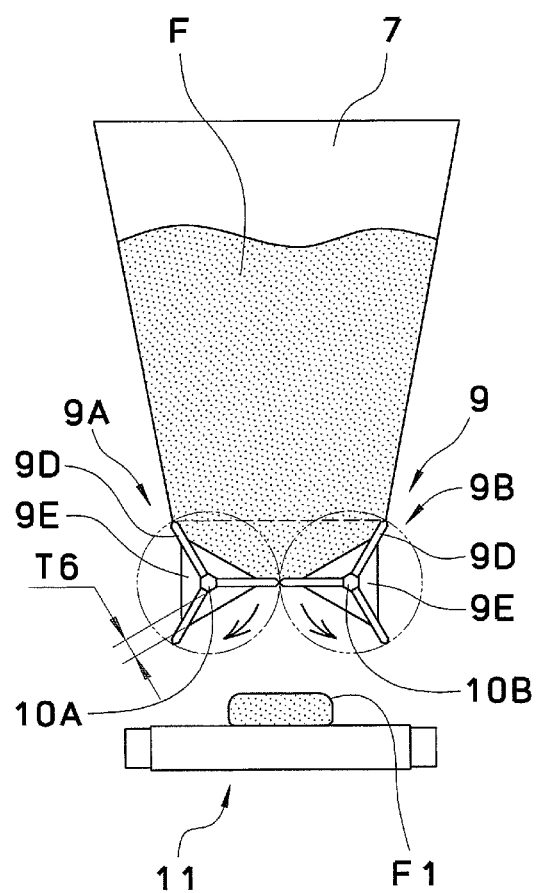

FOOD DOUGH FORMING DEVICE

TECHNICAL FIELD

The present invention relates to a food dough forming device for forming food dough, such as bread dough, into band-like food dough, and a food dough dividing device including the food dough forming device.

BACKGROUND ART

A conventional food dough forming device includes a hopper, and a plurality of narrowing and pressing device which is disposed below the hopper and arranged in up-down direction in a multi-step way so that a distance between members opposed to each other in an upper narrowing and pressing device is large, while a distance between members opposed to each other in a lower narrowing and pressing device is small, and these distances are repeatedly enlarged and contracted. Further, the food dough forming device is configured so that the narrowing and pressing device can be extended in a direction diagonal to an opposed direction (see Patent Publication 1).

In the food dough forming device described in the Patent Publication 1, since an axial length of the narrowing and pressing device including a plurality of rotatable rollers can be changed, and the food dough forming device further includes side wall plates arranged outside of and adjacent to the opposite ends of the rotatable rollers, the band-like food dough with a desired width can be made.

To extend the axial lengths of the rotatable roller fixed to a rotational shaft, the Patent Publication 1 discloses an example in which supplementary roller members divided into semicircular sections are added onto the rotational shaft at the opposite ends of the rotatable roller. The Patent Publication 1 also discloses that cylindrical rollers are fitted onto the rotatable roller and moved in the axial direction of the rotatable shaft to obtain a required length of the rotatable roller. The Patent Publication 1 also discloses that rotatable rollers with variety of lengths are prepared, and rotatable rollers are replaced with different rotatable rollers with a different length.

Another food dough forming device includes a hopper and a plurality set of rotatable rollers which are disposed below the hopper and configured to be opposed to each other so that a distance between the upper rotatable rollers opposed to each other is large, while a distance between the lower rotatable rollers opposed to each other is small, and the food dough forming device further includes two adjustment plates which are opposed to each other in an axial direction of the rotatable rollers and disposed between the rotatable rollers opposed to each other (see Patent Publication 2).

In the food dough forming device disclosed in the Patent Publication 2, by adjusting a distance between the adjustment plates opposed to each other, the band-like food dough with a desired width can be made.

Another food dough forming device includes at least two rotatable rollers opposed to each other, and two oscillating members which are disposed between the at least two rotatable rollers and which position can be adjusted in an axial direction of the rotatable rollers (see Patent Publication 3).

In the food dough forming device disclosed in the Patent Publication 3, by oscillating or reciprocating the two oscillating members to be moved close to and away from each other at the adjusted position, the band-like food dough with a desired width can be made.

PRIOR ART PUBLICATION

Patent Publication 1: Japanese Patent No. 3056697
Patent Publication 2: Japanese Examined Patent No. S36-018083
Patent Publication 3: Japanese Patent No. 6076338
Patent Publication 4: Japanese Patent Laid-open Publication No. 2000-342160

SUMMARY OF THE INVENTION

Problem to be Solved by the Invention

In the food dough forming device described in the Patent Publication 1, since all the axial lengths of the rotatable rollers are required to be adjusted, there is a problem that a lot of working time is needed to change the setting of the food dough forming device. Further, since the divided supplementary roller members are added to the rotatable rollers or the cylindrical rollers are fitted to the rotatable rollers, there is a sanitary problem that clearances are caused between these parts and the food dough may make inroads into these clearances so that miscellaneous bacteria may be developed.

Further, in the food dough forming devices described in the Patent Publication 2 and 3, the rotational shafts of the plurality of the rotatable rollers are fixed to their predetermined positions of the food dough forming device. Specially, in the food dough forming device described in the Patent Publication 3, the two oscillating members, which limit the width of the band-like food dough to be made, have a plurality of fitting recesses into which an arc portion of the periphery of each of the rotatable rollers is fitted. In these cases, there is a problem that a distance between the rotatable rollers opposed to each other cannot be changed by moving the rotatable rollers close to and away from each other like the food dough forming device described in the Patent Publication 1, and also a problem that cleaning of the food dough forming device is difficult.

Thus, the object of the present invention is to provide a food dough forming device which is sanitary or in which the rotatable rollers can be easily detached, attached, and cleaned.

Means for Solving the Problem

To achieve the above-stated problem, a food dough forming device for forming a food dough into a band-like food dough according to the present invention has a main body frame; at least two rotatable rollers arranged parallel to each other; two wall plates opposed to each other in an axial direction of the rotatable rollers, and two support structure units supporting the respective two wall plates; wherein a dough forming flow path is formed to be enclosed between the at least two rotatable rollers and between the two wall plates, wherein at least one of the at least two rotatable rollers is at least one long rotatable roller which is longer than the at least one remaining rotatable roller, the long rotatable roller being fixed to a rotational shaft for the long rotatable roller, and opposite ends of the rotational shaft being rotatably supported by the main body frame, wherein the at least one remaining rotatable roller is at least one short rotatable roller having the same length which is shorter than a length of the long rotatable roller, the short rotatable roller being detachably fitted onto a rotational shaft for the short rotatable roller, and a far-side end of the rotatable shaft for the short rotatable roller is cantilevered and rotatably supported by the main body frame or a roller drive unit attached to the long rotatable roller, wherein a far-side wall plate of the two wall plate has a fitting recess into which an arc portion of a periphery of the long rotatable roller is fitted, and a recessed cutout at the rotational shaft for the short rotatable roller which recessed cutout is larger than a diameter of the rotational shaft for the short rotatable roller and smaller than an outer diameter of the short rotatable roller, the far-side wall plate being supported via a far-side support structure unit of the two support structure units by the main body frame, wherein the short rotatable roller is fitted onto the rotational shaft for the short rotatable roller to abut the far-side wall plate, wherein a near-side wall plate of the two wall plates has at least one fitting recess into which the arc portion of the periphery of the at least one long rotatable roller is fitted, the near-side wall plate being disposed to abut the short rotatable roller, and supported via a near-side support structure unit of the two support structure units by the main body frame, and wherein an axial movement of the short rotatable roller is limited by the two wall plates.

In an embodiment of the food dough forming device, the far-side end of the rotational shaft of the short rotatable roller may be cantilevered and rotatably supported by the main body frame or by the roller drive unit attached to the long rotatable roller.

In an embodiment of the food dough forming device, preferably, the far-side wall plate is detachably supported by the far-side support structure unit in a fitting way, and the near-side wall plate is detachably supported by the near-side support structure unit in a fitting way.

In an embodiment of the food dough forming device, preferably, the far-side support structure unit includes a support shaft supported by the main body frame, and a holding pin connecting the support shaft with the far-side wall plate.

In an embodiment of the food dough forming device, preferably, the near-side support structure unit includes a support structure detachably attached to the main body frame, and a holding pin connecting the support structure with the near-side wall plate in a fitting way.

In an embodiment of the food dough forming device, preferably, at least one of the short rotatable rollers is allowed to be swung around one of the long rotatable rollers.

In an embodiment of the food dough forming device, preferably, the at least one short rotatable roller is allowed to be moved close to and away from the at least one long rotatable roller.

Further, to achieve the above-stated problem, a food dough dividing device according to the present invention has a hopper containing a mass of the food dough; a cutting device disposed at a bottom opening of the hopper to cut the mass of the food dough into a bar-like food dough; and the above-stated food dough forming device for forming the cut bar-like food dough into a band-like food dough. The cutting device is preferably a star-cutter-type cutting device.

According to the present invention, since the two wall plates are supported by the two support structure unit, and the short rotatable rollers are arranged between the two wall plates opposed to each other so that the axial movements of the short rotatable rollers are limited, the two wall plates and the short rotatable rollers can be easily detached from and attached to the main body frame of the food dough forming device.

Thus, each of the detached parts can be cleaned to solve the sanitary problem.

BRIEF DESCRIPTION OF THE DRAWINGS

FIG. 14c is a cross-sectional view of an alternative of the hopper and the cutting device.

DESCRIPTION OF EMBODIMENTS

Figure 1:
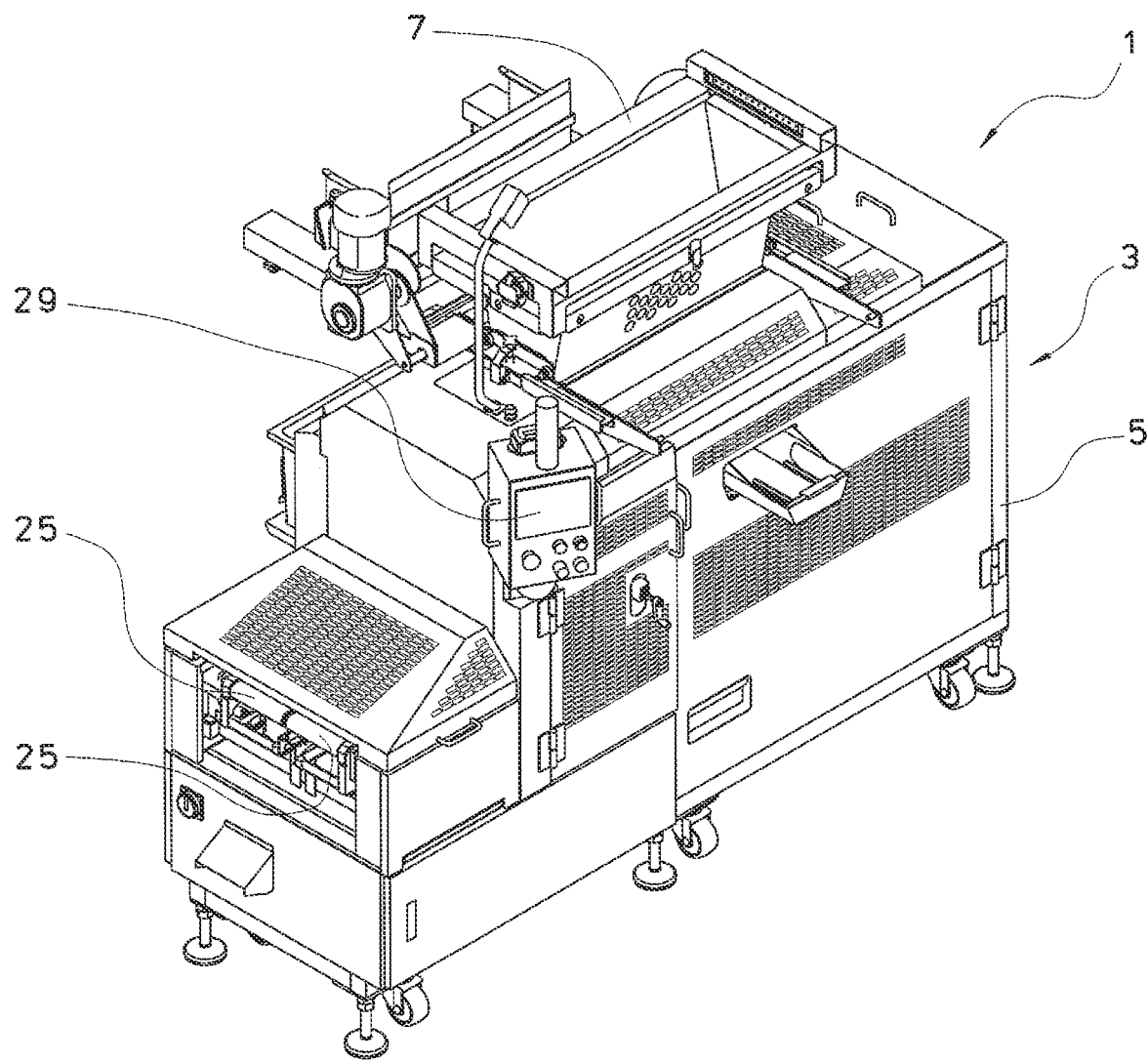
FIG. 1 is a schematically perspective view showing a food dough dividing device including a food dough forming device according to a first embodiment of the present invention, viewed from front, downstream and upper side.
Figure 2:
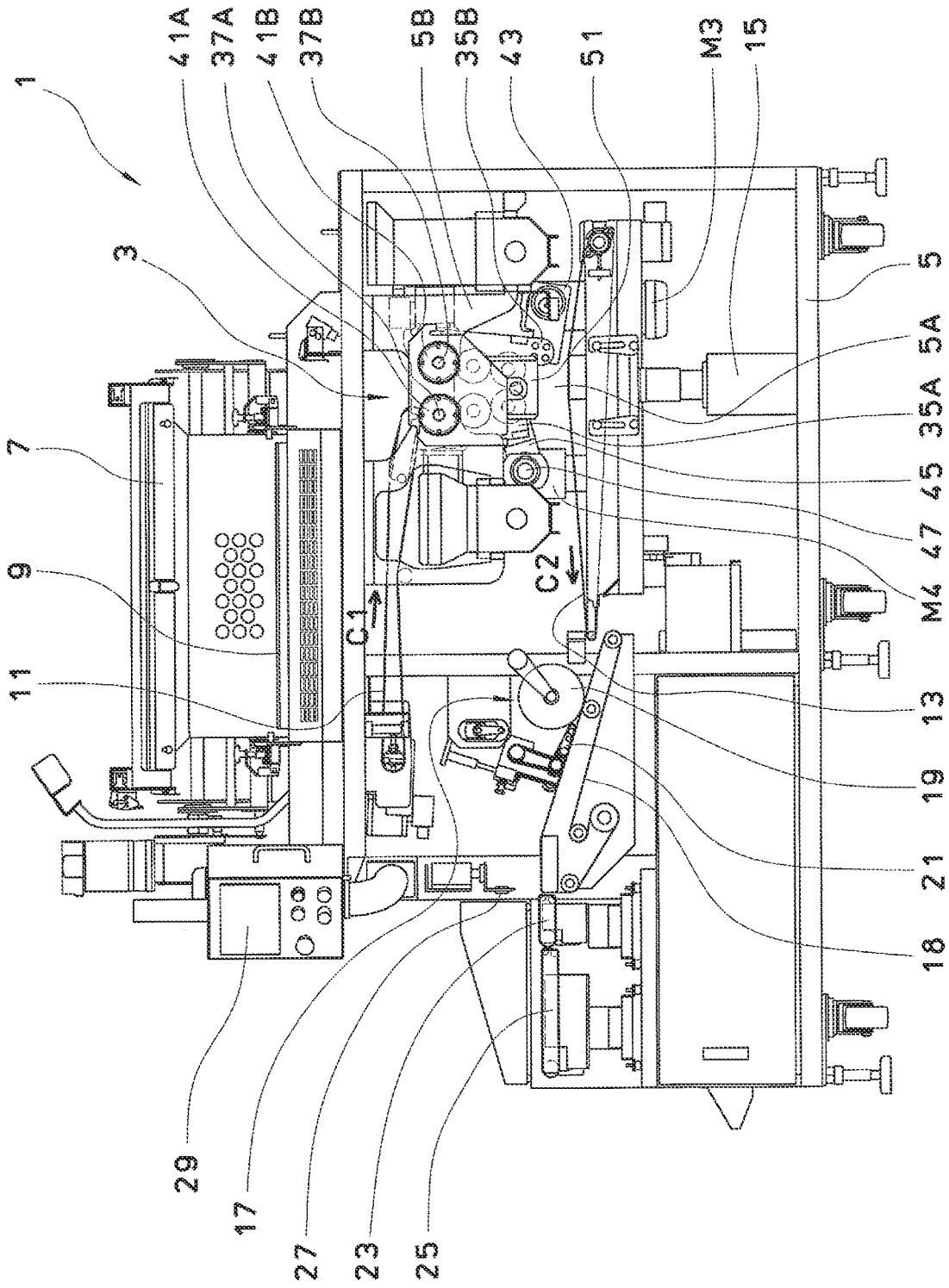
FIG. 2 is a schematically and partially cross-sectional front view showing the food dough dividing device including the food dough forming device according to the first embodiment of the present invention.

Now, using the drawings, a food dough dividing device 1 having a food dough forming device 3 according to a first embodiment of the present invention will be explained. As conceptually and schematically shown in FIGS. 1, 2 and 6, the food dough dividing device 1 has a box-shaped hopper 7 at an upper part of a main body frame 5 for containing a mass of food dough F, such as bread dough. The food dough dividing device 1 has also a cutting device 9 at a position corresponding to an opening at a bottom of the hopper 7, and the cutting device 9 is defined by a pair of star-shaped cutters. The cutting device 9 is configured to cut the mass of the food dough F into a bar-like food dough F1 with a given length to supply the cut food dough F1 downwardly.

Further, the food dough dividing device 1 has a supplying conveyer 11 which is configured to convey or transfer the elongated food dough F1 in a conveying direction C1 (in a right direction in FIGS. 2 and 6), the elongated food dough F1 being cut in the given length by the cutting device 9. Thus, the food doughy F1 which are sequentially cut by the cutting device 9 can be continuously connected on the supplying conveyer 11 to be conveyed in the conveying direction C1. Since structures of the hopper 7, the cutting device 9, and the supplying conveyer 11 are known, explanations of them are omitted.

The food dough dividing device 1 has also a food dough forming device 3 at a position corresponding to a downstream end of the supplying conveyer 11. The food dough forming device 3 has six rotatable rollers 31A, 32A, 33A, 31B, 32B, 33B which are arranged in a V configuration. Further, the food dough dividing device 1 has a first feeding conveyor 13 below the food dough forming device 3. The first feeding conveyor 13 is configured to convey a food dough F2 in a conveying direction C2 (in a left direction in FIGS. 2 and 6), the food dough F2 being formed into a band form with an approximately constant thickness by the food dough forming device 3.

The food dough dividing device 1 has also a centering device 15 at the first feeding conveyor 13. The centering device 15 is configured to detect a center of a width of the band-like food dough F2 conveyed by the first feeding conveyor 13 and center it to a given position. Further, the food dough dividing device 1 has a separating and spreading device 17 for the band-like food dough F2 on a downstream side of the first feeding conveyor 13. The separating and spreading device 17 has a second feeding conveyor 18, a cutter 19, and two spreading conveyors 21. The cutter 19 is a cutting device in a form of circular disk and is disposed so that the center of the band-like food dough F2 centered by the centering device 15 disposed above the second feeding conveyor is cut along the conveying direction. The two spreading conveyors 21 are disposed side by side in the width direction and configured to spread in a lateral direction and convey two band-like cut food dough F3.

Further, the food dough dividing device 1 has two first weighing conveyors 23 which are arranged side by side and disposed downstream of the second feeding conveyor 18 in the conveying direction. The first weighing conveyors 23 are configured to weigh the band-like food dough F3 while transferring it. Further, the food dough dividing device 1 has second weighing conveyors 25 adjacent to and downstream of the first weighing conveyors 23, and a guillotine-type cutting device 27 above a position between the second feeding conveyor 18 and the first weighing conveyor 23. The guillotine-type cutting device 27 is configured to be activated when a weighed value of the first weighing conveyor 23 corresponds to a set value and cut a rectangular food dough F4 from the band-like food dough F3. The cut food dough F4 is transferred to the second weighing conveyor 25 and weighed again by the second weighing conveyor 25.

Further, the food dough dividing device 1 has a control device 29, such as a computer, for controlling operations of the entire device. Since the structures of the first feeding conveyor 13, the centering device 15, the separating and spreading device 17, the first weighing conveyors 23, the second weighing conveyors 25, and the cutting device 27 are known, their detail explanations are omitted.

Next, referring to FIGS. 2-6, the food dough forming device 3 according to the first embodiment of the present invention will be explained in detail. For convenient explanations, a near side for a viewer of the front views shown in FIGS. 2 and 6 will be referred to as a "near side" of the food dough forming device 3, while a far side for the viewer thereof will be referred to as a "far side" of the food dough forming device 3. As shown in FIGS. 3-6, the food dough forming device 3 has the six rotatable rollers 31A, 32A, 33A, 31B, 32B, 33B arranged in the V configuration, and a pair of wall plates 51, 53 which are opposite to each other in an axial direction of the six rotatable rollers. The food dough forming device 3 has a function of forming a supplied food dough into a band-like food dough F2 with an approximately constant thickness. In the first embodiment, such a band-like food dough F2 with an approximately constant thickness is made by conveying a food dough F1 from the supplying conveyer 11, overlapping a leading end of a subsequent food dough F1 onto a trailing end of the former food dough F1, and pressing the food doughs F1 in an overlapping direction.

Figure 3:
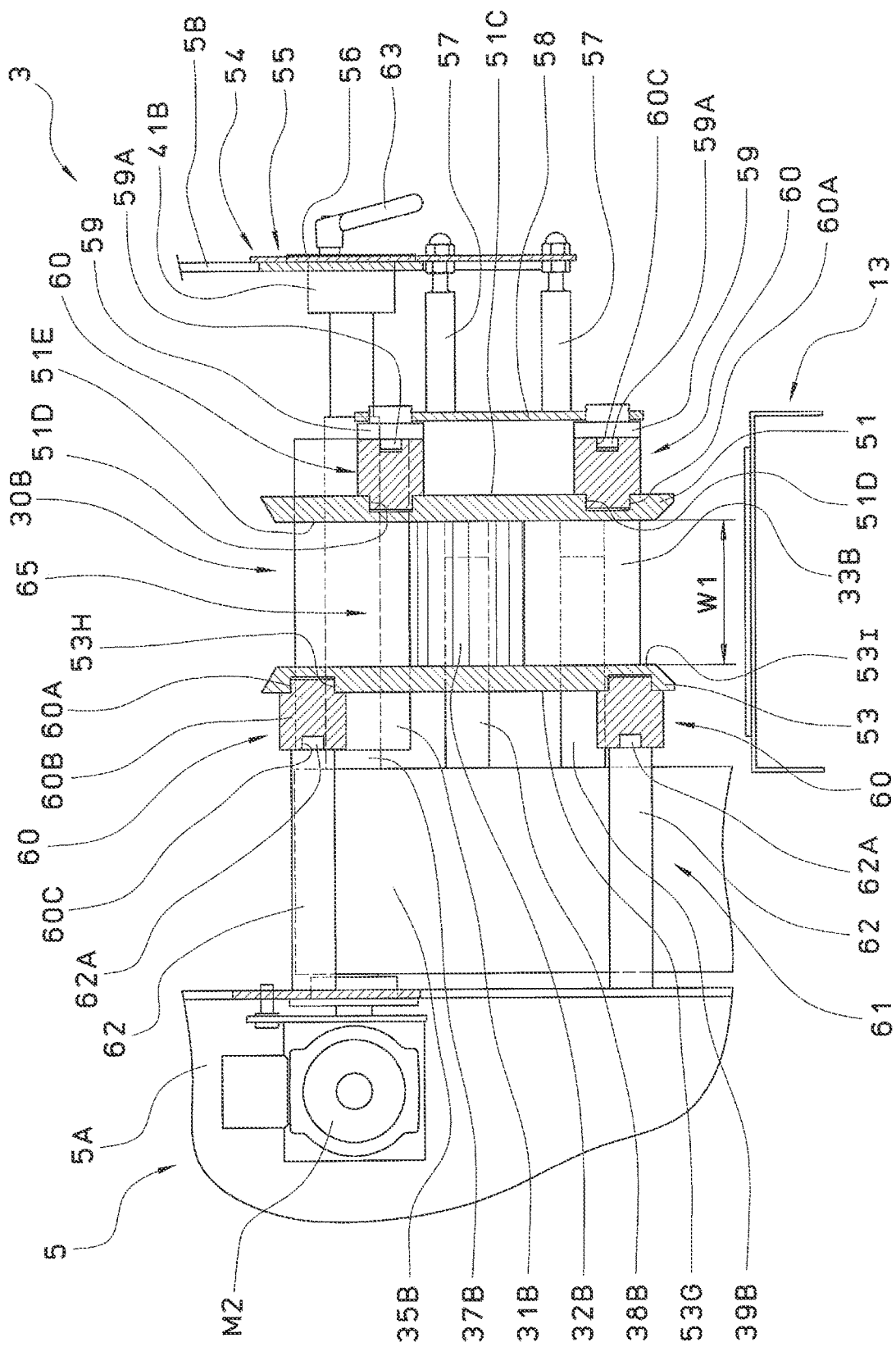
FIG. 3 is a schematically and partially cross-sectional left-side view showing the food dough forming device according to the first embodiment of the present invention.
Figure 6:
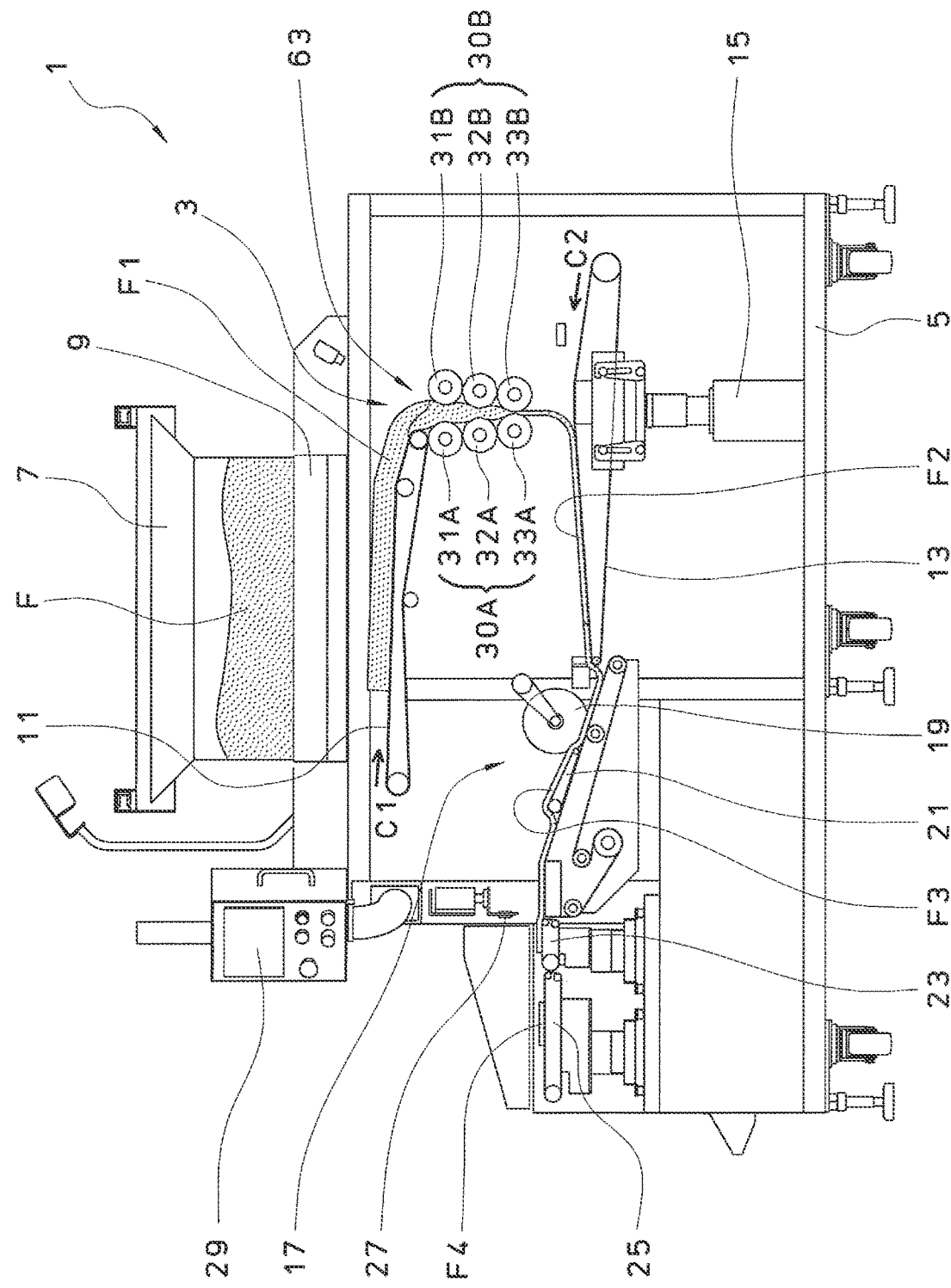
FIG. 6 is a front view schematically showing processes of forming the food dough by the food dough dividing device including the food dough forming device according to the first embodiment of the present invention.

In the front view of FIG. 6, the six rotatable rollers define left and right sets of the three rollers, namely, a left roller set 30A and a right roller set 30B. The right roller set 30B includes the upper long rotatable roller 31B, the intermediate short rotatable roller 32B, and the lower short rotatable roller 33B. Referring to FIG. 3, axial lengths of the intermediate and lower short rotatable rollers 32B, 33B are equal to each other, while an axial length of the upper long rotatable roller 31B is longer than the axial lengths of the short rotatable rollers 32B, 33B.

The right roller set 30B further includes a box-shaped roller drive unit 35B, and rotational shafts 37B, 38B, 39B supporting the rotatable rollers 31B, 32B, 33B, respectively. The roller drive unit 35B is disposed between the far-side box-shaped frame 5A of the main body frame 5 and the upper long rotatable roller 31B, and rotatably supported by the upper rotational shafts 37B at a center thereof in the axial direction. The rotational shafts 37B, 38B, 39B are driven together via an appropriate power transmitting mechanism (not shown), such as chains and gears, disposed in the roller drive unit 35B, and are configured to be rotated in the same direction (counterclockwise in the front view) so that as the rotational shaft goes toward the downstream or lower side, a speed of the rotational shaft becomes faster. Further, the rotational shafts 37B, 38B, 39B are disposed parallel to each other.

The opposite ends of the upper rotational shaft 37B are rotatably supported by the main body frame 5 of the food dough forming device 3. A base end (far-side end or left end in FIG. 3) of the upper rotational shaft 37B is connected to a drive motor M2 disposed within the far-side box-shaped frame 5A of the main body frame 5. Further, a tip end (near-side or right end in FIG. 3) of the upper rotational shaft 37B is supported via a bearing 41B by a near-side plate-like front frame 5B of the main body frame 5. The upper long rotatable roller 31B is fixed to the upper rotational shaft 37B.

Base ends (far-side ends) of the intermediate and lower rotational shafts 38B, 39B are supported by the roller drive unit 35B, while tip ends (near-side ends) of the intermediate and lower rotational shafts 38B, 39B are free ends. Namely, the intermediate and lower rotational shafts 38B, 39B are cantilevered and supported by the roller drive unit 35B.

A lower end of the roller drive unit 35B is connected via a crank mechanism 43 to a drive motor M3 attached to the main body frame 5. The right roller set 30B is allowed to be periodically reciprocated (swung) around the upper rotational shaft 37B by driving the drive motor M3 (see FIG. 2).

In the front view, the left roller set 30A is configured to be substantially symmetrical with the right roller set 30B. The left roller set 30A includes a roller drive unit 35A, the upper rotatable roller 31A, the intermediate rotatable roller 32A, the lower rotatable roller 33A, an upper rotational shaft 37A, an intermediate rotational shaft 38A, and a lower rotational shaft 39A (see FIGS. 2, 4 and 5).

The opposite ends of the upper rotational shaft 37A is rotatably supported by the main body frame 5. A base end (far-side end or left end in FIG. 3) of the upper rotational shaft 37A is connected to a drive motor M1 (not shown) disposed within the box-shaped frame 5A of the main body frame 5. Further, a tip end (near-side end or right end in FIG. 3) of the upper rotational shaft 37A is supported via a bearing 41A by the near-side plate-like front frame 5B of the main body frame 5. The upper long rotatable roller 31A is fixed to the upper rotational shaft 37A.

Base ends (far-side ends) of the intermediate and lower rotational shafts 38A, 39A are supported by the roller drive unit 35A, while tip ends (near-side ends) of the intermediate and lower rotational shafts 38A, 39A are free ends. Namely the intermediate and lower rotational shafts 38A, 39A are cantilevered and supported by the roller drive unit 35A.

A lower end of the roller drive unit 35A is connected via a crank mechanism 45 to a drive motor M4 attached to the main body frame 5. The left roller set 30A is allowed to be swung around the upper rotational shaft 37A by an action of the drive motor M4 to adjust a fixed position of the left roller set 30A. Depending on the fixed position of the left roller set 30A, a thickness of the food dough F2 flown and discharged downwardly from the food dough forming device can be adjusted (see FIG. 2).

In the first embodiment, outer diameters of the six rotatable rollers are the same as each other, and the lower the rotatable roller goes, the faster a rotational speed of the rotatable roller becomes. The short rotatable rollers 32A, 33A, 32B, 33B are detachably fitted onto the rotational shafts 38A, 39A, 38B, 39B via an engaging mechanism having a key member and a key groove, respectively. Length of the rotational shafts 38A, 39A, 38B, 39B are preferably as long as possible, but defined so that the rotational shafts 38A, 39A, 38B, 39B do not extend beyond the short rotatable rollers 32A, 33A, 32B, 33B which are fitted onto the rotatable shafts. As explained later, when the length of the short rotatable rollers is changed or the central position of the short rotatable rollers in the longitudinal direction is changed, the rotational shafts 38A, 39A, 38B, 39B are preferably defined so that they do not extend beyond the short rotatable rollers after changed. Further, the peripheral surfaces of the intermediate short rotatable rollers 32A, 32B are formed with a plurality of D-shaped chamfers 32AS, 32BS extending in the axial direction (see FIG. 4). Scrapers 40 are attached via brackets to the roller drive units 35A, 35B to abut the lower short rotatable rollers 33A, 33B.

The near-side (right side in FIG. 3) wall plate 51 is supported via a near-side support structure unit 54 by the near-side front frame 5B of the main body frame 5. As shown in FIG. 3, the support structure unit 54 includes a near-side support structure 55 and holding pins 60. The near-side support structure 55 includes an attachment plate 56 detachably attached to the near-side front frame 5B of the main body frame 5, two support shafts 57 attached to the attachment plate 56, a connecting plate 58 connected to tips of the support shafts 57, and connecting pins 59. The attachment plate 56, the support shafts 57, and the connecting plate 58 are assembled to form a frame, and the connecting pins 59 are fixed to upper and lower portions of the connecting plate 58. The holding pin 60 includes a small-diameter convex portion 60A at one end of the holding pin 60 in the axial direction, a flange portion 60B, and a concave aperture 60C at the other end of the holding pin 60 in the axial direction, and a small-diameter step portion of the connecting pin 59 is fitted into the concave aperture 60C.

In the front view, the near-side wall plate 51 is an approximately rectangular and flat plate, and includes fitting recesses 51A, 51B on upper-left and upper-right sides of the near-side wall plate 51. The fitting recesses 51A, 51B are formed so that are portions of cylindrical peripheries of the upper long rotatable rollers 31A, 31B are fitted into the fitting recesses 51A, 51B, respectively. Further, a near-side surface 51C of the near-side wall plate 51 includes two concave apertures 51D into which the convex portions 60A of the holding pins 60. A far-side surface 51E of the near-side wall plate 51 is opposite to a near-side surface 53I of the far-side wall plate 53.

The far-side wall plate 53 is disposed on a far-side (left side in FIG. 3) with respect to the near-side wall plate 51, and supported via a far-side support structure unit 61 to the far-side box-shaped frame 5A of the main body frame 5. As shown in FIG. 3, the far-side support structure unit 61 includes two support shafts 62 and the holding pins 60. This far-side holding pin 60 has the same shape of the near-side holding pin 60, and small-diameter step portion 62A of the support shaft 62 is detachably fitted into the concave aperture 60C of the holding pin 60.

The far-side wall plate 53 is a flat plate, and includes fitting recesses 53A, 53B on upper-left and upper-right sides of the far-side wall plate 53. The fitting recesses 53A, 53B are formed so that arc portions of cylindrical peripheries of the upper long rotatable rollers 31A, 31B are fitted into the fitting recesses 53A, 53B, respectively. Further, recessed cutouts 53C, 53E are formed below the left fitting recess 53A and at upper and lower positions corresponding to the intermediate and lower rotational shafts 38A, 39A, while recessed cutout 53D, 53F are formed below the right fitting recess 53B and at upper and lower positions corresponding to the intermediate and lower rotational shafts 38B, 39B. Shapes of the recessed cutouts 53C, 53D, 53E, 53F are the same as each other, and sizes of the recessed cutouts 53C, 53D, 53E, 53F are larger than diameters of the rotational shafts 38A, 39A, 38B, 39B, and smaller than outer diameters of the short rotatable rollers 32A, 33A, 32B, 33B.

Further, the far-side wall plate 53 includes two recessed apertures 53H into which the convex portions 60A of the far-side holding pins 60 are fitted, and the nearside surface 53I of the far-side wall plate 53 is opposed to the far-side surface 51E of the near-side wall plate 51. The short rotatable rollers 32A, 33A, 32B, 33B are disposed between the near-side wall plate 51. and the far-side wall plate 53 so that the axial movements of the short rotatable rollers 32A, 33A, 32B, 33B are limited by the near-side wall plate 51 and the far-side wall plate 53.

Figure 4:
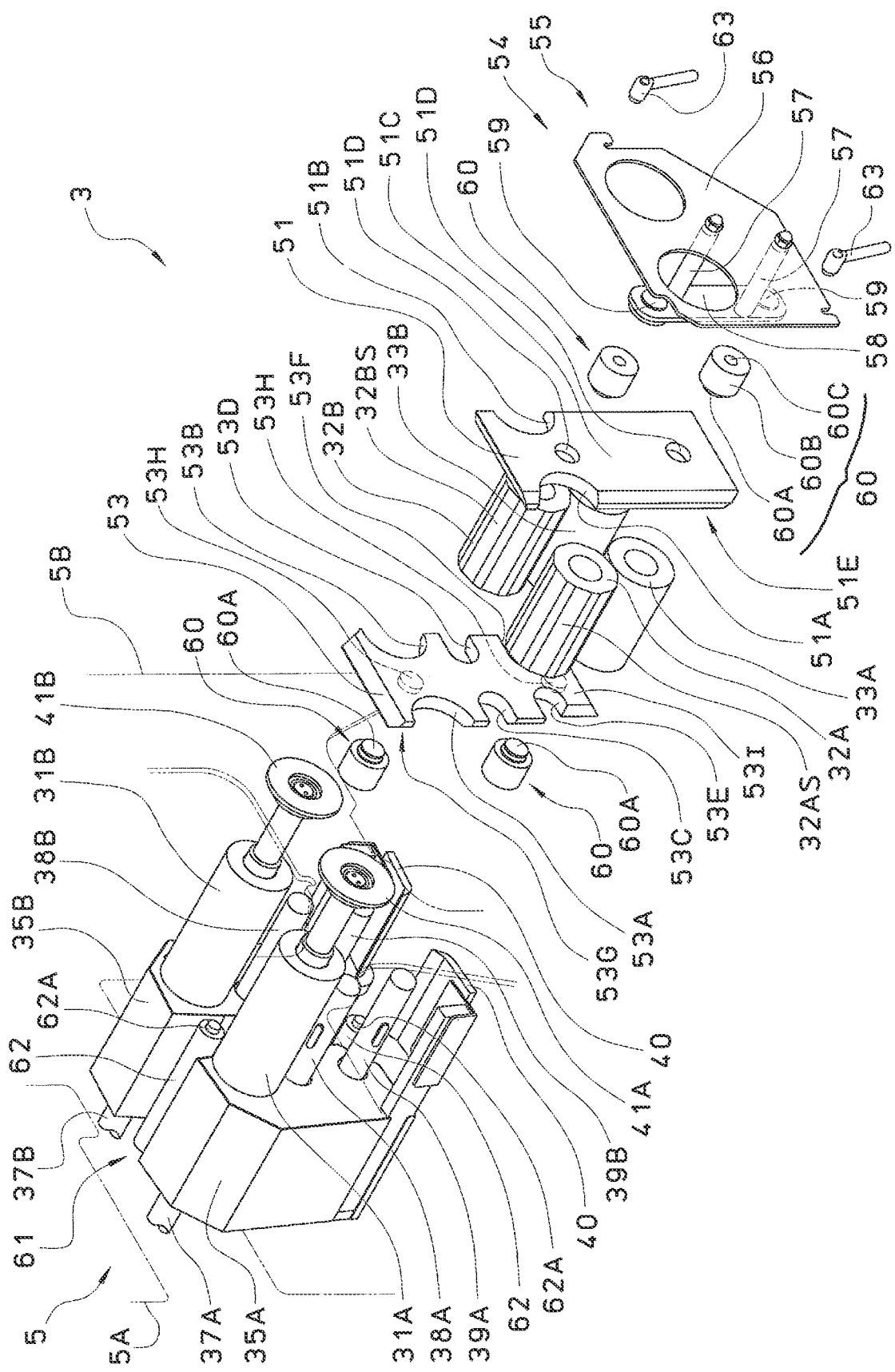
FIG. 4 is a schematically exploded perspective view showing the food dough forming device according to the first embodiment of the present invention, viewed from front, downstream and upper side.
Figure 5:
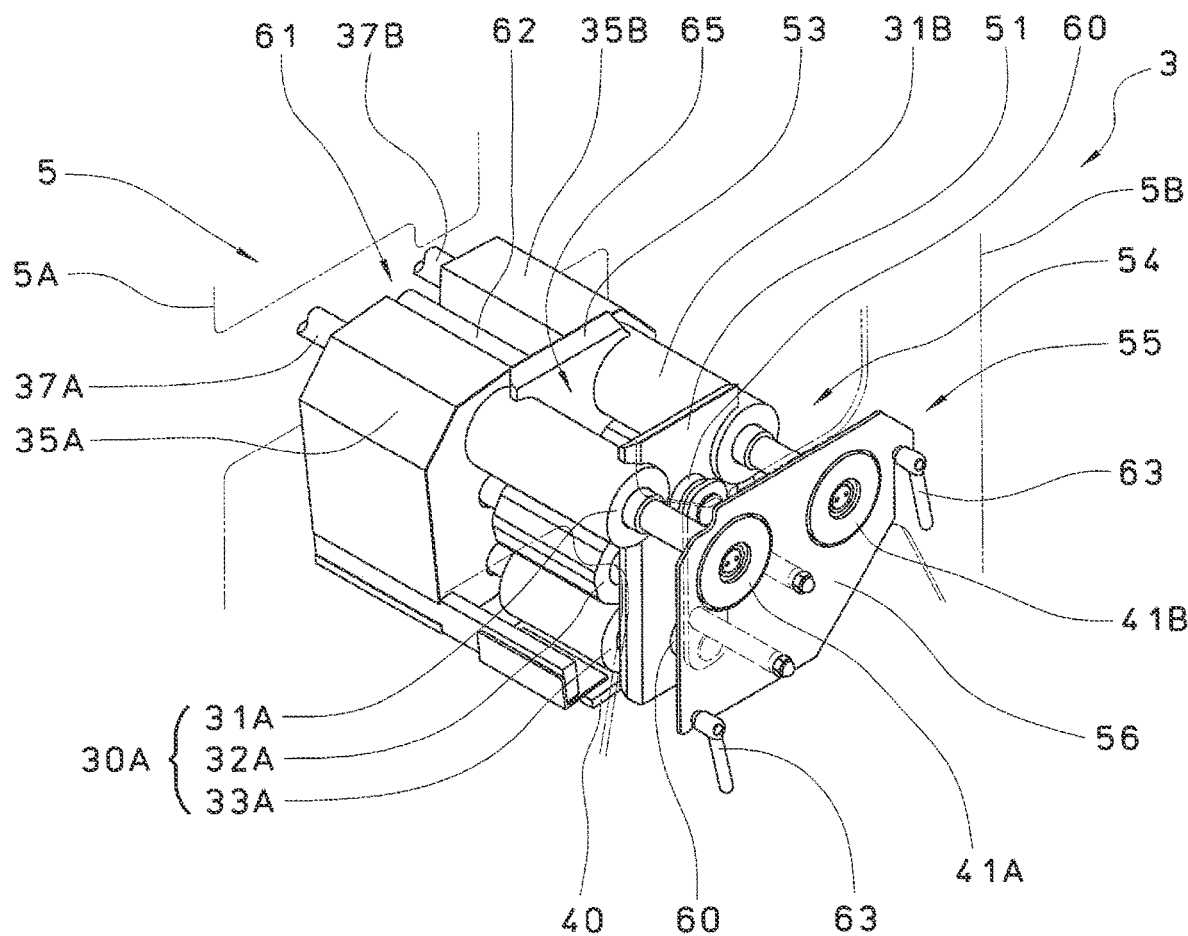
FIG. 5 is a schematically assembled perspective view showing the food dough forming device according to the first embodiment of the present invention, viewed from front, downstream and upper side.

Next, referring to FIGS. 4 and 5, an assembling procedure of the food dough forming device 3 will be explained.

The apertures 60C of the far-side holding pins 60 are fitted onto step portions 62A of the two support shafts 62 which extend from the box-shaped frame 5A of the main body frame 5. Then, the far-side wall plate 53 is disposed between the rotational shafts 37A, 37B of the long rotatable rollers 31A, 31B, for example, by passing through a space between the long rotatable rollers 31A, 31B, and the fitting recess 53A, 53B of the far-side wall plate 53 are fitted onto the upper long rotatable rollers 31A, 31B, respectively. Further, the far-side wall plate 53 is pressed from the near side toward the far side so that the apertures 53H of the far-side surface 53G of the far-side wall plate 53 are fitted onto the convex portions 60A of the far-side holding pins 60. The far-side wall plate 53 is positioned by causing the far-side wall plate 53 to abut the far-side holding pins 60.

Next, the intermediate short rotatable rollers 32A, 32B and the lower short rotatable rollers 33A, 33B are fitted onto the rotational shafts 38A, 38B, 39A, 39B from the near side toward the far side, respectively and are pressed from the near side toward the far side until a far-side end surface of each of the short rotatable rollers abuts the near-side surface 53I of the far-side wall plate 53.

Next, the near-side wall plate 51 is disposed between the rotational shafts 37A, 37B of the long rotatable rollers 31A, 31B, for example, by passing through a space between the long rotatable rollers 31A, 31B, the fitting recess 51A, 51B of the near-side wall plate 51 are fitted onto the upper long rotatable rollers 31A, 31B, respectively, and the near-side wall plate 51 is pressed from the near side toward the far side. The near-side wall plate 51 is positioned by abut the far-side surface 51E of the near-side wall plate 51 against near-side end surfaces of the short rotatable rollers 32A, 32B, 33A, 33B.

The convex portions GOA of the near-side holding pins 60 are fitted into the apertures 51D of the near-side surface 51C of the near-side wall plate 51, and the step portions 59A of the connecting pins 59 are fitted into the apertures 60C of the near-side holding pins 60. The attachment plate 56 of the near-side support structure 55 is attached to the near-side front frame 5B of the main body frame 5 with attachment screws 63.

In the food dough forming device 3 assembled in this way, a dough forming flow path 65 is formed to be enclosed between the far-side surface 51E of the near-side wall plate 51 and the near-side surface 53I of the far-side wall plate 53 opposed to each other, and, between the rotatable rollers 31A, 32A, 33A of the left roller set 30A and the rotatable rollers 31B, 32B, 33B of the right roller set 30B opposed to each other. The intermediate and lower short rotatable rollers 32B, 33B of the right roller set 30B are allowed to be periodically reciprocated (swung) around the upper long rotatable roller 31B so that an inside region of the dough forming flow path 65 is repeatedly enlarged and contracted. The food dough forming device 3 allows the food dough F1 to be flown downwardly and formed into the band-like food dough F2 with an approximately constant thickness and the given width W1 within the dough forming flow path 65.

Explanations of the food dough dividing device 1 which includes the food dough forming device 3 according to the first embodiment of the present invention has been substantially completed, but the present invention is not limited to the above-stated explanations and can be modified within the scope of the claims. In the above-stated explanations, the supplied food dough F1 is formed into the food dough F2 with the width W1, but the width of the food dough F2 may be a width W2 which is wider than the width W1.

Figure 7:
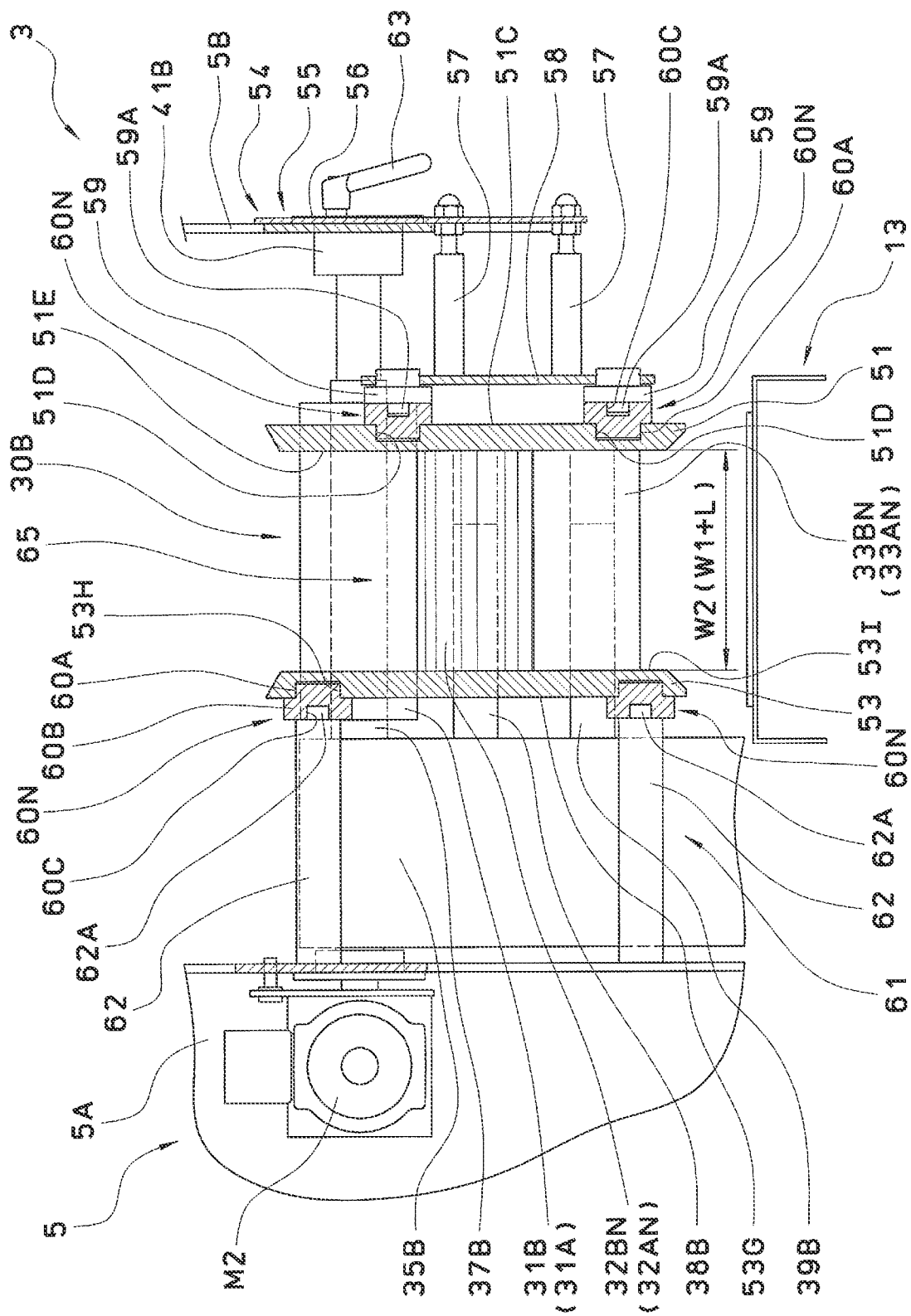
FIG. 7 is a schematically and partially cross-sectional left-side view showing a first alternative of the food dough forming device according to the first embodiment of the present invention.

Next, referring to FIG. 7, a first alternative of the food dough forming device according to the first embodiment of the present invention will be explained. In the first embodiment, the food dough is formed into the food dough F2 with the width W1, but in the first alternative, the food dough is formed into the food dough F2 with a width W2 which is wider than the width W1. For example, as shown in FIG. 7, the axial length of intermediate and lower short rotatable rollers 32AN, 32BN, 33AN, 33BN is longer than the axial length of the intermediate and lower short rotatable rollers 32A, 32B, 33A, 33B of the above-stated food dough forming device 3 by the length L. Further, far-side and near-side holding pins 60N used in the first alternative have a shape which is similar to that of the holding pin 60 used in the first embodiment, but the holding pins 60N in the first alternative have an axial length which is shorter than the axial length of the holding pins 60 in the first embodiment by the length of L/2. Namely, an axial length of the short rotatable rollers 32AN, 33AN, 32BN, 33BN opposed to each other, or a distance between the near-side wall plate 51 and the far-side wall plate 53 opposed to each other becomes about W2 (W1+L).

A replacement procedure with the short rotatable rollers 32AN, 33AN, 32BN, 33BN and the holding pins 60N will be explained. Using the opposite procedure to the above-stated assembling procedure of the food dough forming device 3, the near-side support structure unit 54, the near-side wall plate 51, the four short rotatable rollers 32A, 33A, 32B, 33B, the far-side wall plate 53, and the far-side holding pins 60 are removed from the main body frame 5 toward the near side. Then, the short rotatable rollers 32A, 33A, 32B, 33B are replaced with the short rotatable rollers 32AN, 33AN, 32BN, 33BN, and the holding pins 60 are replaced with the holding pins 60N. The short rotatable rollers 32AN, 33AN, 32BN, 33BN and the holding pins 60N are assembled by using a procedure similar to the above-stated assembling procedure of the food dough forming device 3.

In this first alternative, the central position of the short rotatable rollers (such as the short rotatable roller 32AN) in the axial direction correspond to that of the short rotatable rollers (such as the short rotatable roller 32A) in the axial direction, wherein the latter rollers are shorter than the former rollers. Namely, the central position of the short rotatable rollers (such as the short rotatable roller 32AN) in the axial direction is not changed with respect to the main body frame 5 and the first feeding conveyor 13. The central position of the band-like food dough F2 in the width direction is transferred to approximately the same position of the first feeding conveyor 13 regarding the width direction.

Figure 8:
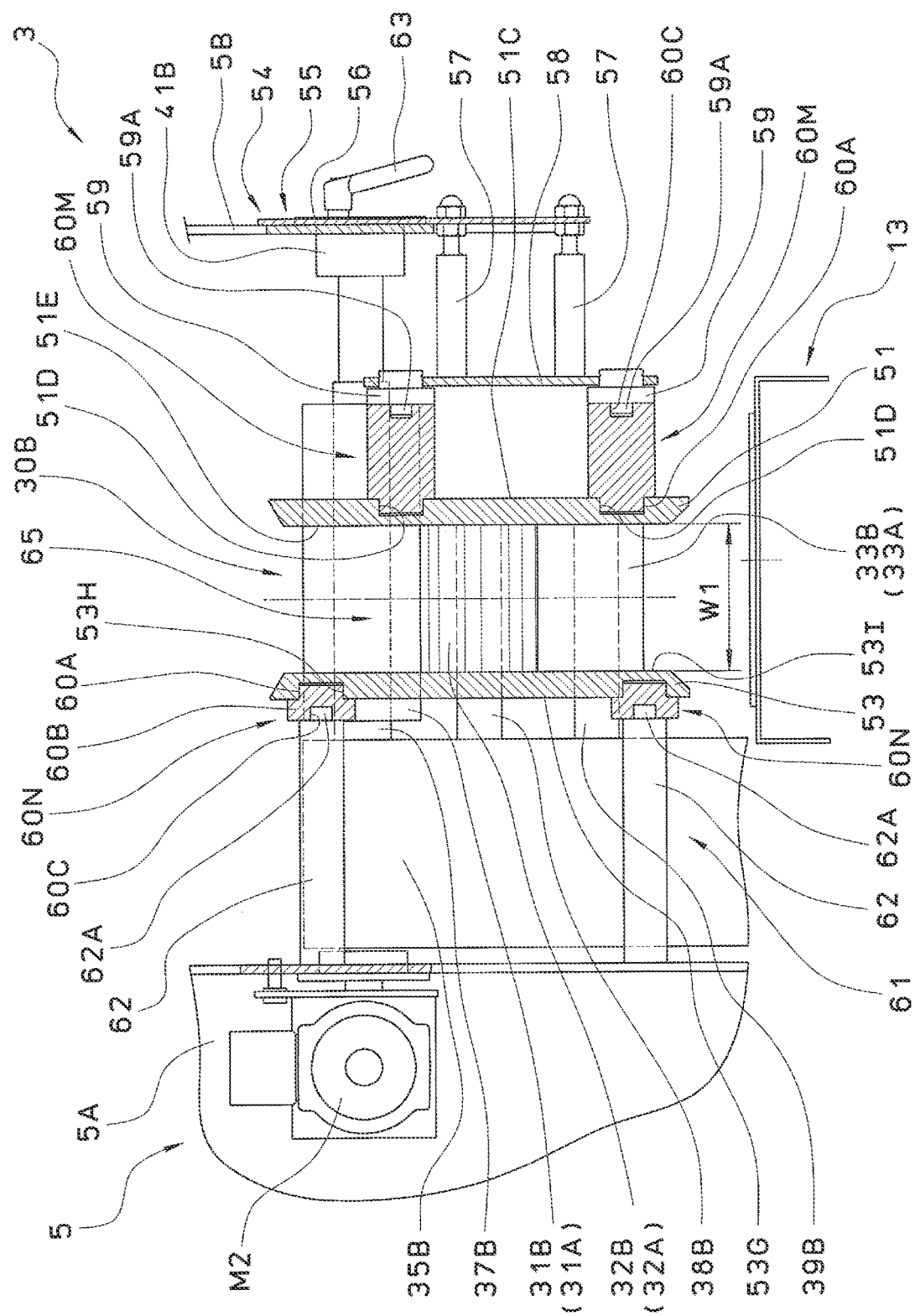
FIG. 8 is a schematically and partially cross-sectional left-side view showing a second alternative of the food dough forming device according to the first embodiment of the present invention.

In a structure of a second alternative shown in FIG. 8, the intermediate and lower short rotatable rollers 32AN, 32BN, 32AN, 33BN in the first alternative are replaced with the short rotatable rollers 32A, 32B, 33A, 33B of the first embodiment. Further, in this structure, the near-side two of the four holding pins 60N are replaced with holding pins 60M. The holding pins 60M have a shape similar to that of the holding pins 60 of the first embodiment, but the holding pins 60M have an axial length which is longer than that of the holding pins 60 by the length of L/2, and are disposed between the connecting pins 59 of the near-side support structure unit 54 and the near-side wall plate 51.

In this second alternative, the central position of the short rotatable rollers (such as the short rotatable roller 32A) in the longitudinal or axial direction is moved toward the box-shaped frame 5A or toward the far side with respect to the main body frame 5 and the first feeding conveyor 13. However, since the food dough dividing device 1 has the centering device 15, the central position of the band-like food dough F2 with the width W1 in the width direction can be aligned to the disc cutter 19.

When the attachment position of the far-side wall plate 53 with respect to the main body frame 5 is not changed like the second alternative, the holding pins 60N may not be used. In this case, the far-side support shafts may have a length so that the far-side wall plate 53 is attached to the same position, and may include a tip with a step portion which is fitted into the aperture 53H of the far-side wall plate 53.

As can be seen from the above-stated explanations, in the food dough forming device 3, since the short rotatable rollers and the holding pins can be easily replaced, the food dough F2 with a given width W can be made.

Since the near-side wall plate 51, the far-side wall plate 53, the four short rotatable rollers, and the near-side and far-side holding pins can be easily removed from the main body frame; the food dough forming device 3 can be cleaned to every part. Further, although the long rotatable rollers 31A, 31B are supported by the rotational shafts 37A, 37B and still attached to the main body frame of the food dough forming device 3, since the members around the rotatable rollers 31A, 31B are removed to make an opened surroundings, the rotatable rollers 31A, 31B can be easily cleaned by hands so that the food dough forming device 3 can be maintained in a sanitary manner.

Figure 9A:
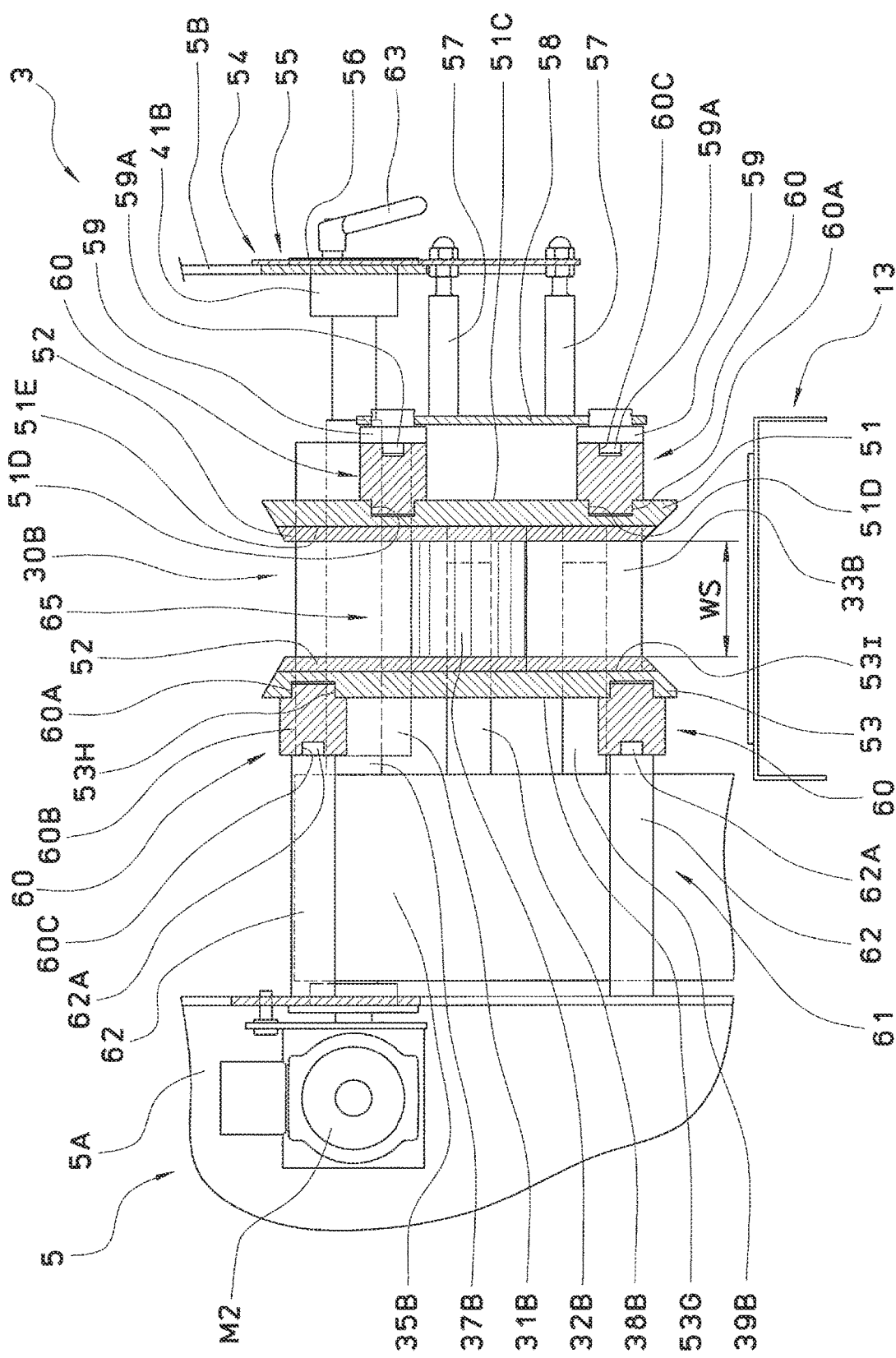
FIG. 9A is a schematically and partially cross-sectional left-side view showing a third alternative of the food dough forming device according to the first embodiment of the present invention.
Figure 9B:
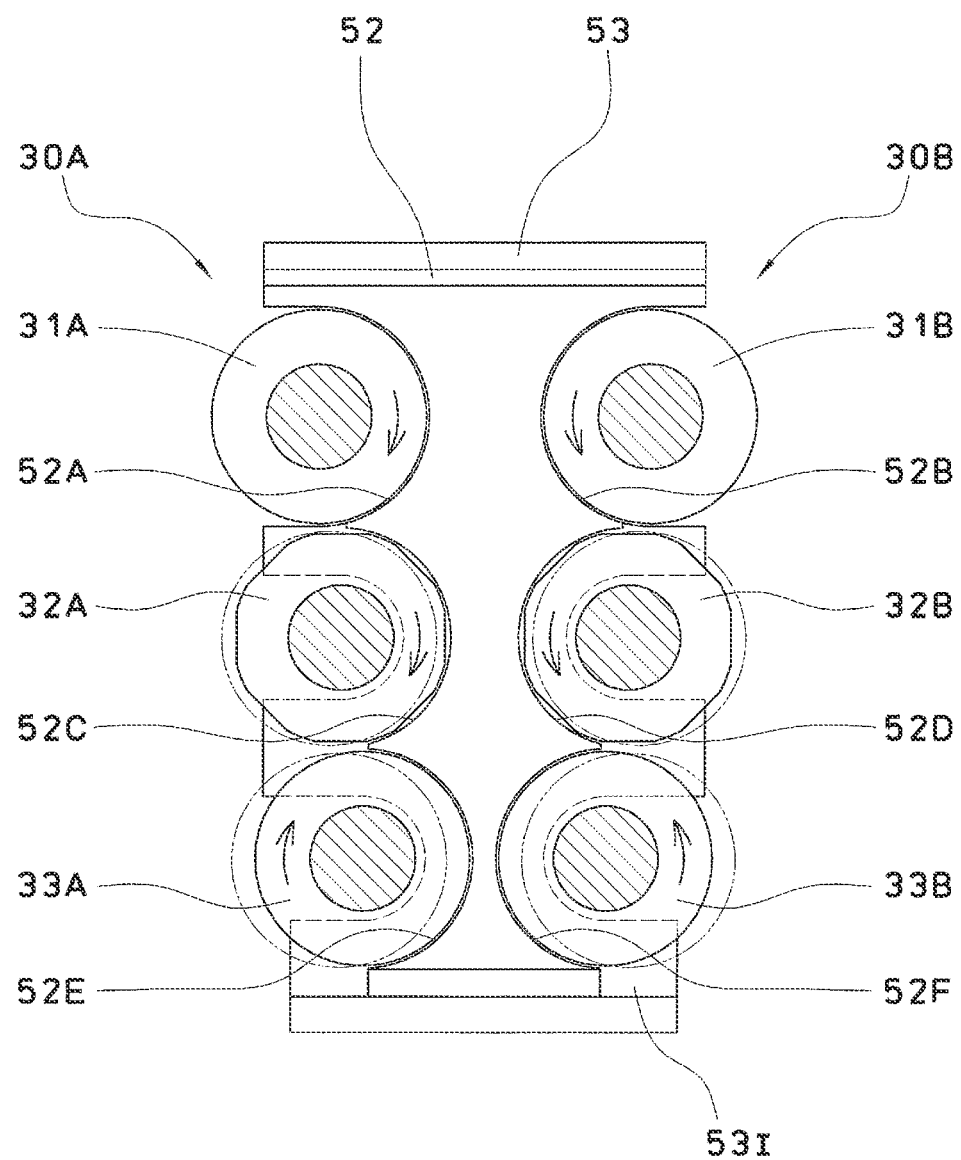
FIG. 9B is a schematically front view showing the main portions of the third alternative of the food dough forming device according to the first embodiment of the present invention.

Next, referring to FIGS. 9A and 9B, a third alternative of the food dough forming device according to the first embodiment of the present invention will be explained. The third alternative is configured so that the food dough F2 is narrowed from the width W1 to a width WS. Concretely two flat supplementary wall plates 52 with a given width may be added to the near-side surface 53I of the far-side wall plate 53 and the far-side surface 51E of the near-side wall plate 51. As shown in FIG. 9B, a left side of the far-side supplementary wall plate 52 has fitting recesses 52A, 52C, 52E arranged in the up-down direction, while a right side of the far-side supplementary wall plate 52 has fitting recesses 52B, 52D, 52F arranged in the up-down direction. Inner edges of the fitting recesses preferably correspond positions where the left roller set 30A and the right roller set 30b conic closest to each other and are shaped to fit onto the arc portions of the peripheries of the cylindrical rotatable rollers 31A, 32A, 33A, 31B, 32B, 33B. The near-side supplementary wall plate 52 may be symmetrically formed to the far-side supplementary wall plate 52. In the third alternative, since the left roller set 30A and the right roller set 30B are arranged in a bilaterally symmetrical way, the near-side supplementary wall plate may have the same shape as that of the far-side supplementary wall plate.

The dough forming flow path 65 is formed by a region mainly enclosed by the supplementary wall plates 52 opposed to each other and the left and right roller sets 30A, 30B opposed to each other. It is preferable that the supplementary wall plates 52 have a given width and are detachably attached to the wall plates 51, 53 with a known engaging mechanism. By changing the width of the supplementary wall plates 52, the width W of the food dough F2 formed by the food dough forming device 3 can be increased or decreased. Alternatively the supplementary wall plates 52 may be formed to be integral with the wall plates 51, 53.

Figure 10A:
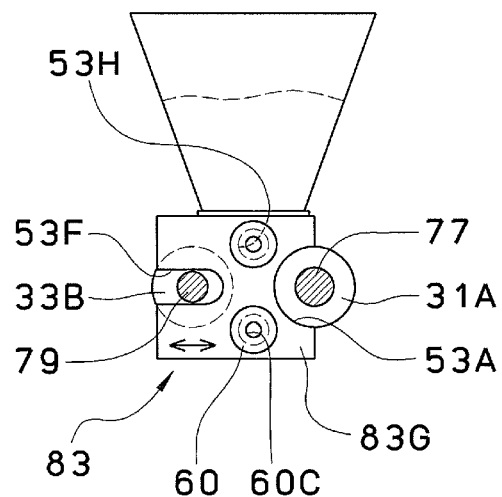
FIG. 10a is a schematically rear view showing main portions of a food dough forming device according to a second embodiment of the present invention.
Figure 10B:
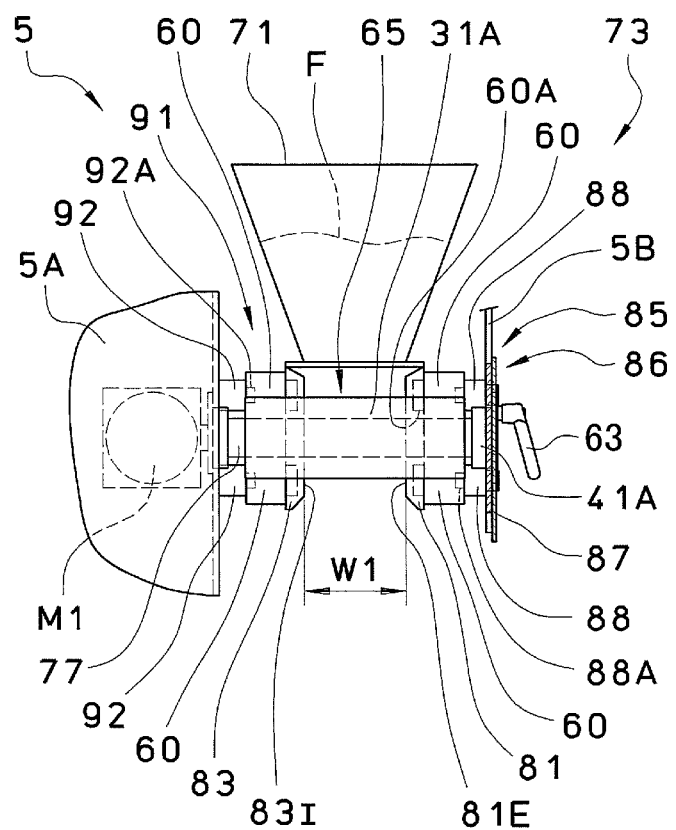
FIG. 10b is a schematically left-side view showing the main portions of the food dough forming device according to the second embodiment of the present invention.
Figure 10C:
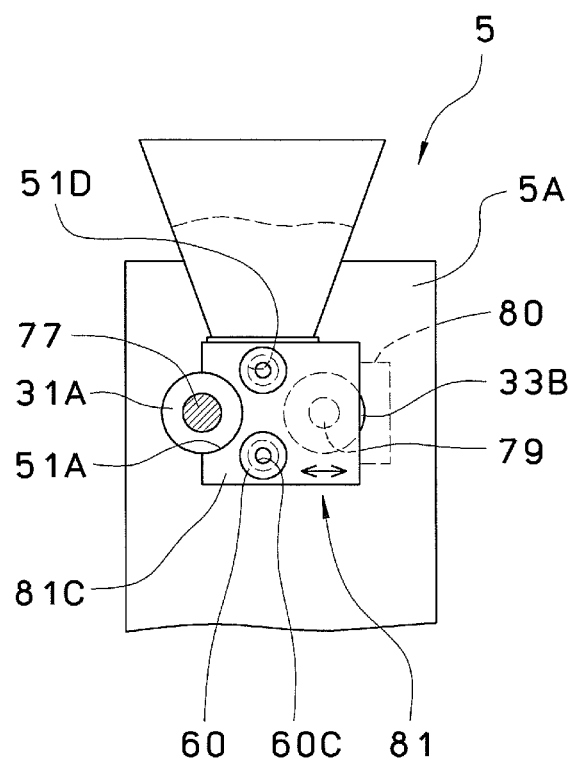
FIG. 10c is a schematically front view showing the main portions of the food dough forming device according to the second embodiment of the present invention.

Next, referring to FIGS. 10a-10c, a food dough forming device 73 according to a second embodiment of the present invention will be explained. The same reference numbers as those of the components in the food dough forming device 3 according to the first embodiment are attached to components in the food dough forming device 73 having functions similar to those in the food dough forming device 3, and explanations of the components in the food dough forming device 73 are omitted. As shown in FIGS. 10a-10c, the food dough forming device 73 is disposed below the hopper 71, and has one long rotatable roller 31A, one short rotatable roller 33B, a near-side wall plate 81, a near-side support structure unit 85, a far-side wall plate 83, and a far-side support structure unit 91. The food dough forming device 73 is configured to form a supplied food dough into a band-like food dough F2 with an approximately constant thickness, and in the second embodiment, is configured to form a mass of the food dough F contained in the hopper 71 into the band-like food dough F2 with an approximately constant thickness. Thus, the hopper 7, the cutting device 9, and the supplying conveyor 11 in the food dough dividing device 1 of the first embodiment are omitted.

The long rotatable roller 31A is fixed to a rotational shaft 77. A base end (far-side end) of the rotational shaft 77 is connected to the drive motor M1 disposed within the far-side box-shaped frame 5A, while a tip end (near-side end) of the rotational shaft 77 is rotatably supported via the bearing 41A by the near-side front frame 5B.

As shown in the front view of FIG. 10c, the short rotatable roller 33B is lateral to (at the same level as that of) the long rotatable rollers 31A so that the rotatable rollers 33B, 31A are opposed to each other, and the short rotatable roller 33 is detachably fitted onto a rotational shaft 79. The rotational shaft 79 is rotatably supported by a position adjustment mechanism 80 disposed within the far-side box-shaped frame 5A. The position adjustment mechanism 80 is configured to adjust a fixed position of the rotational shaft 79, and, for example, is a known mechanism which has a bearing slidably disposed in a frame, and a combination of a screw rod and a nut connected to the bearing, and is configured to reciprocate the bearing by rotating the screw rod in both directions to allow the rotational shaft 79 rotatably supported by the bearing to be moved close to or away from the long rotatable rollers 31A. Further, the rotational shaft 79 is connected to the drive motor M2 (not shown) disposed within the box-shaped frame 5A. Thus, the rotational shaft 79 is cantilevered and supported by the main body frame 5. The length of the rotational shaft 79 is preferably as long as possible, but it is determined so that the rotational shaft 79 does not extend beyond the short rotatable roller 33B which is fitted onto the rotational shaft 79.

The near-side wall plate 81 is supported via the nearside support structure unit 85 to the near-side front frame 5B of the main body frame 5. The near-side support structure unit 85 includes a support structure 86 and the holding pins 60. The support structure 86 includes a support plate 87 detachably attached to the front frame 5B, and support shafts 88 attached to the support plate 87. A tip of the support shaft 88 has a small-diameter step portion 88A onto which the apertures 60C of the holding pin 60 is fitted.

In the front view, the near-side wall plate 81 is an approximately rectangular and flat plate, and a left side of the near-side wall plate 81 has a fitting recess 51A into which an arc portion of a cylindrical periphery of the long rotatable roller 31A is fitted. Further, the near-side surface 81.0 of the near-side wall plate 81 has at the center thereof two (upper and lower) apertures 51D into which the convex portion 60A of the holding pins 60 are fitted. The far-side surface 81E of the near-side wall plate 81 is opposed to the far-side wall plate 83.

The far-side wall plate 83 is disposed on the far side with respect to the near-side wall plate 81, and supported via a far-side support structure unit 91 to the far-side box-shaped frame 5A of the main body frame 5. The far-side support structure unit 91 includes two (upper and lower) support shafts 92 attached to the box-shaped frame 5A, and the holding pins 60 detachably attached to step portions 92A of tips of the support shafts 92.

As shown in the rear view of FIG. 10a, the far-side wall plate 83 is an approximately rectangular and flat plate, a left side (in the front view) of the far-side wall plate 83 includes a fitting recess 53A into which the arc portion of the periphery of the long rotatable roller 31A is fitted, and a right side (in the front view) of the far-side wall plate 83a includes a recessed cutout 53F at a position corresponding to the rotational shaft 79. The recessed cutout 53F is formed to be larger than a diameter of the rotational shaft 79 and smaller than an outer diameter of the short rotatable roller 33B.

Further, a far-side (near-side for a viewer of FIG. 10a) surface 83G of the far-side wall plate 83 has recessed apertures 53H into which the convex portions 60A of the holding pins 60 are fitted. A near-side (right side in FIG. 10b) surface 83I of the far-side wall plate 83 is opposed to the far-side surface 81E of the near-side wall plate 81. The short rotatable roller 33B is disposed between the far-side wall plate 83 and the near-side wall plate 81, and an axial movement of the short rotatable roller 33B is limited by the far-side wall plate 83 and the near-side wall plate 81.

An assembling procedure of the food dough forming device 73 is generally similar to that of the food dough forming device 3. In the food dough forming device 73 assembled in this way, a dough forming flow path 65 is formed to be enclosed by the far-side surface 81E of the nearside wall plate 81 and the nearside surface 83I of the far-side wall plate 83 which are opposed to each other, and between the long rotatable roller 31A and the short rotatable roller 33B which are opposed to each other. The dough forming flow path 65 can be enlarged and contracted according to the fixed position of the short rotatable roller 33B which position is adjusted by the position adjustment mechanism 80. The food dough forming device 73 is configured to cause the food dough F to be flown downwardly through the dough forming flow path 65 to form the food dough F into the band-like food dough F2 with an approximately constant thickness and a given width W1.

Further, by replacing the short rotatable roller 33B in the food dough forming device 73 with a longer short rotatable roller 33BN and replacing the holding pins 60 with the holding pins 60N (explained fir the first alternative in the first embodiment), the food dough forming device 73 is allowed to form the supplied food dough into the band-like food dough F2 with an approximately constant thickness and the width W2.

Explanations of the food dough forming device 73 according to the second embodiment of the present invention has been substantially completed, but the present invention is not limited to the above-stated explanations and a variety of modifications can be made within the scope of the claims. In the above-stated explanations, the six rotatable rollers 31A, 32A, 33A, 31B, 32B, 33B are included in the food dough forming device 3, and the two rotatable rollers 31A, 33B are included in the food dough forming device 73, but as shown in FIGS. 11a-11c and FIGS. 12a-12b, three or four rotatable rollers may be included. Further, in the above-stated explanations, the main body frame 5 to which the support structure units 85, 91 are attached is the main body frame 5 of the food dough dividing device 1, and the food dough forming device 73 may include such a main body frame.

Figure 11A:
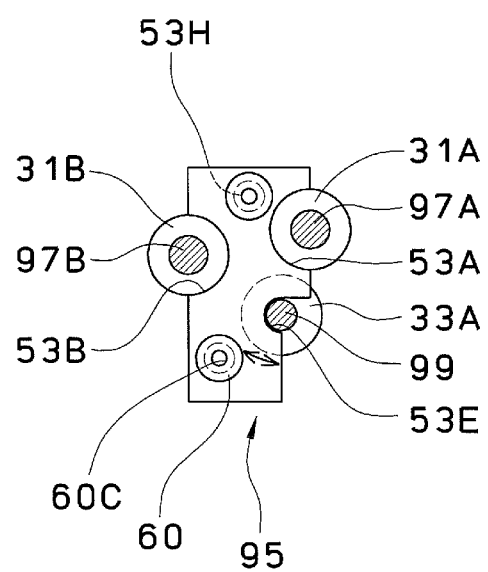
FIG. 11a is a schematically rear view showing main portions of a food dough forming device according to a third embodiment of the present invention.
Figure 11B:
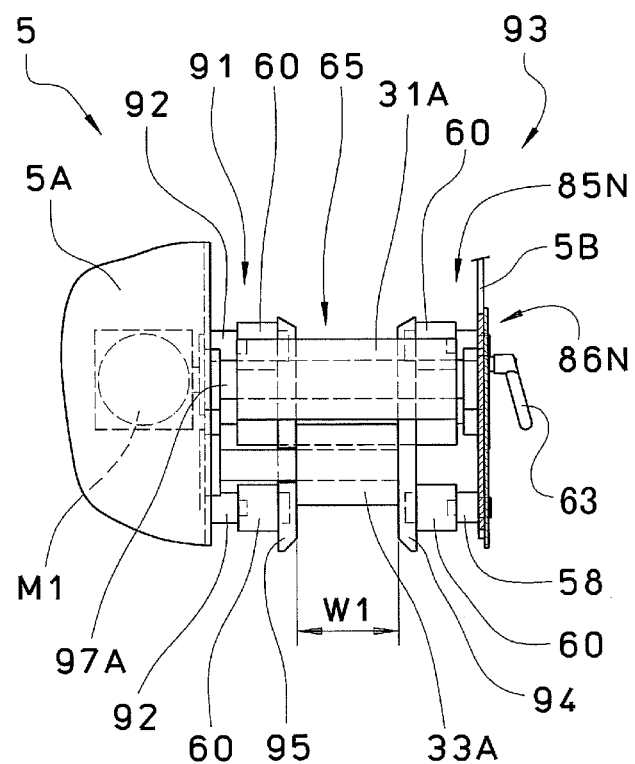
FIG. 11b is a schematically left-side view showing the main portions of the food dough forming device according to the third embodiment of the present invention.
Figure 11C:
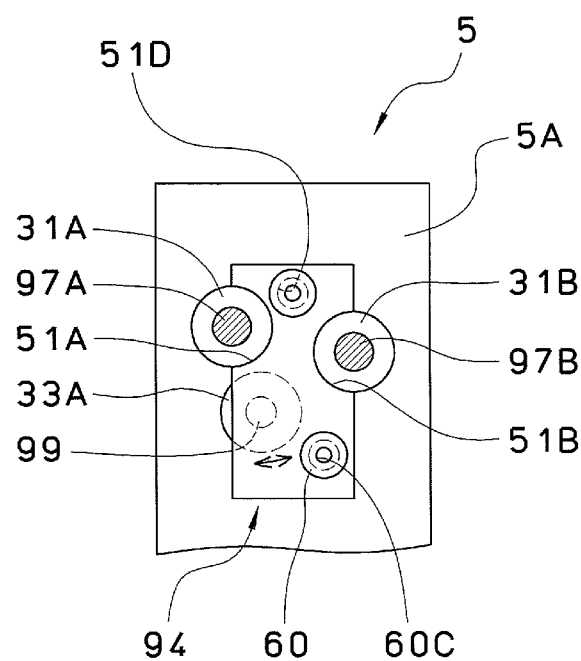
FIG. 11c is a schematically front view showing the main portions of the food dough forming device according to the third embodiment of the present invention.

Next, referring to FIGS. 11a-11c, a food dough forming device 93 according to a third embodiment of the present invention will be explained. The same reference numbers as those of the components in the food dough forming device 3 or the food dough forming device 73 are attached to components in the food dough forming device having functions similar to those in the food dough forming device 3, 73, and explanations of the components in the food dough forming device are omitted. The food dough forming device 93 has two long rotatable rollers 31A, 31B, one short rotatable roller 33A, a near-side wall plate 94, and a far-side wall plate 95. The long rotatable roller 31A is fixed to a rotational shaft 97A therefor, and opposite ends of the rotational shaft 97A are supported by the main body frame 5.

The short rotatable roller 33A is disposed obliquely below the long rotatable roller 31A with a given distance. The short rotatable roller 33A is detachably fitted into a rotational shaft 99 therefor, which is cantilevered and rotatably supported by the far-side box-shaped frame 5A of the main body frame 5. The length of the rotational shaft 99 is preferably as long as possible, but is determined so that the rotational shaft 99 does not extend beyond the short rotatable roller 33A which is fitted into the rotational shaft 99. The rotational shaft 97A for the long rotatable roller 31A and the rotational shaft 99 for the short rotatable roller 33A are connected to an appropriate power transmitting mechanism (not shown) including chain and gears disposed within the far-side box-shaped frame 5A of the main body frame 5, and are configured to be rotated by the drive motor M1 in the same direction (clockwise in the front view shown in FIG. 11c). Further, the short rotatable roller 33A is allowed to be swung in the left-right direction around the long rotatable roller 31A, and the position of the short rotatable roller 33A can be adjusted so that it moves close to and away from the long rotatable roller 31B.

The long rotatable roller 31B is opposed to the long rotatable roller 31A, and laterally (right side in the front view) and downwardly disposed with respect to the long rotatable roller 31A with a given distance. The long rotatable roller 31B is fixed to a rotational shaft 97B therefor, and opposite ends of the rotational shaft 97B is supported by the main body frame 5. The rotational shaft 97B is rotated in a direction opposite to that of the long rotatable roller 31A and the short rotatable roller 33A (counterclockwise in the front view in FIG. 11c) by the drive motor M2 (not shown) disposed within the far-side box-shaped frame 5A of the main body frame 5.

The near-side wall plate 94 and the far-side wall plate 95 are disposed to be opposed to each other in an axial direction of the long rotatable rollers 31A, 31B and the short rotatable roller 33A. The near-side wall plate 94 is supported via the near-side support structure unit 85N by the near-side front frame 5B of the main body frame 5. The near-side support structure unit 85N includes a support structure 86N and the holding pins 60. The near-side support structure 86N is configured to be functionally similar to the support structure 86 in the second embodiment. A left side (in the front view of FIG. 11c) of the near-side wall plate 94 has a fitting recess 51A, while a right side of the near-side wall plate 94 has a fitting recess 51B, and the fitting recesses 51A, 51B are slidably fitted onto the long rotatable rollers 31A, 31B, respectively. The near-side wall plate 94 includes apertures 51D into which the holding pins 60 of the near-side support structure unit 85N is fitted.

A left side (in the front view) of the far-side wall plate 95 includes a fitting recess 53A, while a right side (in the front view) of the far-side wall plate 95 has a fitting recess 53B, and the fitting recesses 53A, 53B are slidably fitted onto the long rotatable rollers 31A, 31B, respectively. Further, the far-side wall plate 95 includes a recessed cutout 53E at a position corresponding to the rotational shaft 99 of the short rotatable roller 33A below the fitting recess 53A. The far-side wall plate 95 includes apertures 53H into which the far-side holding pins 60 are fitted. The far-side wall plate 95 is disposed on a far side with respect to the nearside wall plate 94, and supported via the far-side support structure unit 91 to the far-side box-shaped frame 5A of the main body frame 5. The short rotatable roller 33A is disposed between the near-side wall plate 94 and the far-side wall plate 95, and an axial movement of the short rotatable roller 33A is limited by the wall plates 94, 95.

The food dough forming device 93 has a dough forming flow path 65 enclosed by the wall plates 94, 95 opposed to each other, a left roller set including the long and short rotatable rollers 31A, 33A, and the long rotatable roller 31B. The dough forming flow path 65 is allowed to be enlarged and contracted according to the adjusted fixed position of the short rotatable roller 33A. The food dough forming device 93 is configured to form the food dough F, which is supplied to the dough forming flow path 65 with an appropriate means, into the band-like food dough F2 with an approximately constant thickness and a given width W1 by causing the food dough F to be flown downwardly and to be discharged through the short rotatable roller 33A and the long rotatable roller 31B opposed to each other.

Next, referring to FIGS. 12a-12c, a food dough forming device 101 according to a fourth embodiment of the present invention will be explained. The same reference numbers as those of the components in the food dough forming device 3 or the food dough forming device 73 are attached to components in the food dough forming device having functions similar to those in the food dough forming device 3, 73, and explanations of the components in the food dough forming device are omitted. The food dough forming device 101 has one long rotatable rollers 31A, three short rotatable rollers 33A, 32B, 33B, a near-side wall plate 104, and a far-side wall plate 105. The four rotatable rollers 31A, 33A, 32B, 33B define left and right roller sets (in the front view of FIG. 12c) of the two rollers, namely, define a left roller set 102A and a right roller set 102B.

The left roller set 102A (in the front view of FIG. 12c) includes the long rotatable roller 31A and the short rotatable roller 33A, and the short rotatable roller 33A is disposed on a right-below side of the long rotatable roller 31A. The long rotatable roller 31A is fixed to a rotational shaft therefor 107, and opposite ends of the rotational shaft 107 are rotatably supported by the main body frame 5. The short rotatable roller 33A is detachably fitted onto a rotational shaft therefor 108, which is cantilevered and rotatably supported by the far-side box-shaped frame 5A of the main body frame 5. The length of the rotational shaft 108 is preferably as long as possible, and determined so that the rotational shaft 108 does not extend beyond the short rotatable roller 33A which fitted onto the short rotatable shaft 108. The rotational shaft 107 for the long rotatable roller 31A and the rotational shaft 108 for the short rotatable roller 33A are connected to a power transmitting mechanism 106 which includes a gear and a belt with teeth disposed within the far-side box-shaped frame 5A of the main body frame 5, and are configured to be rotated by the drive motor M1 in the same direction (clockwise in the front view of FIG. 12c).

The right roller set 102B (in the front view of FIG. 12c) includes the short rotatable rollers 32B, 33B, and the short rotatable roller 33B is disposed on a left-lower side of the short rotatable roller 32B. The short rotatable rollers 32B, 33B are detachably fitted onto the rotational shafts 38B, 39B, respectively, and the rotational shafts 38B, 39B are cantilevered and rotatably supported by the far-side box-shaped frame 5A of the main body frame 5. The length of the rotational shafts 38B, 39B is preferably as long as possible, and determined so that the rotational shafts 38B, 39B do not extend beyond the short rotatable rollers 32B, 33B fitted onto the rotational shafts 38B, 39B. The right roller set 102B further includes a roller drive unit 109. The rotational shafts 38B, 39B of the short rotatable rollers 32B, 33B extend through the roller drive unit 109. A base end (far-side end) of the rotational shaft 38B for the short rotatable roller 32B is located on a far side with respect to the roller drive unit 109, and attached to a gear 103B inside of the far-side box-shaped frame 5A of the main body frame 5. Further, a base end (far-side end) of the rotational shaft 107 for the long rotatable roller 31A is attached to a gear 103A mating with the gear 103B. Further, the rotational shafts 38B, 39B for the short rotatable rollers 32B, 33B are connected to each other via an appropriate power transmitting mechanism (not shown) disposed within the roller drive unit 109, synchronized with the rotation of the rotational shafts 107 of the long rotatable roller 31A, and rotated in a direction opposite to the rotational direction of the rotational shafts 107 (counterclockwise in the front view of FIG. 12c).

A link plate 110 is attached to a side of the roller drive unit 109 of the right roller set 102B, and rotatably supported by the rotational shaft 107 for the left long rotatable roller 31A. Further, an arm 109A is disposed to protrude from a lower end of the roller drive unit 109, and connected via a crank mechanism 43 to the drive motor M3 attached to the frame 5. Thus, the right roller set 102B is periodically reciprocated or swung in the up-down direction around the rotational shaft 107 by the drive motor M3 so that the right roller set 102B moves toward and away from the left roller set 102A.

The near-side wall plate 104 is supported by the near-side front frame 5B of the main body frame 5 via a support structure unit 85M which is configured to be functionally similar to the support structure unit 85 of the second embodiment. In the front view of FIG. 12c, a left side of the near-side wall plate 104 includes a fitting recess 51A which is slidably fitted onto the long rotatable roller 31A. The near-side wall plate 104 includes apertures 51D into which the near-side holding pins 60 are fitted.

Figure 12A:
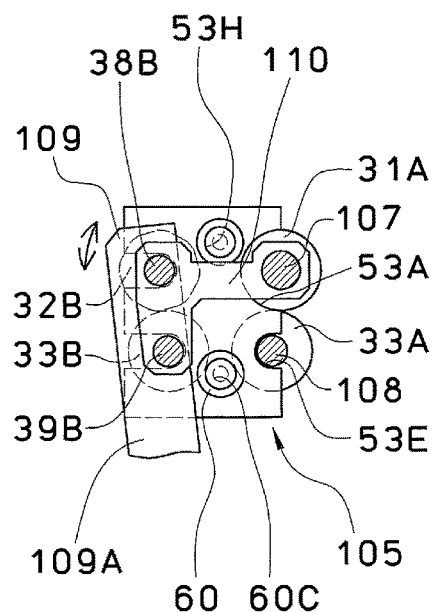
FIG. 12a is a schematically rear view showing main portions of a food dough forming device according to a fourth embodiment of the present invention.
Figure 12B:
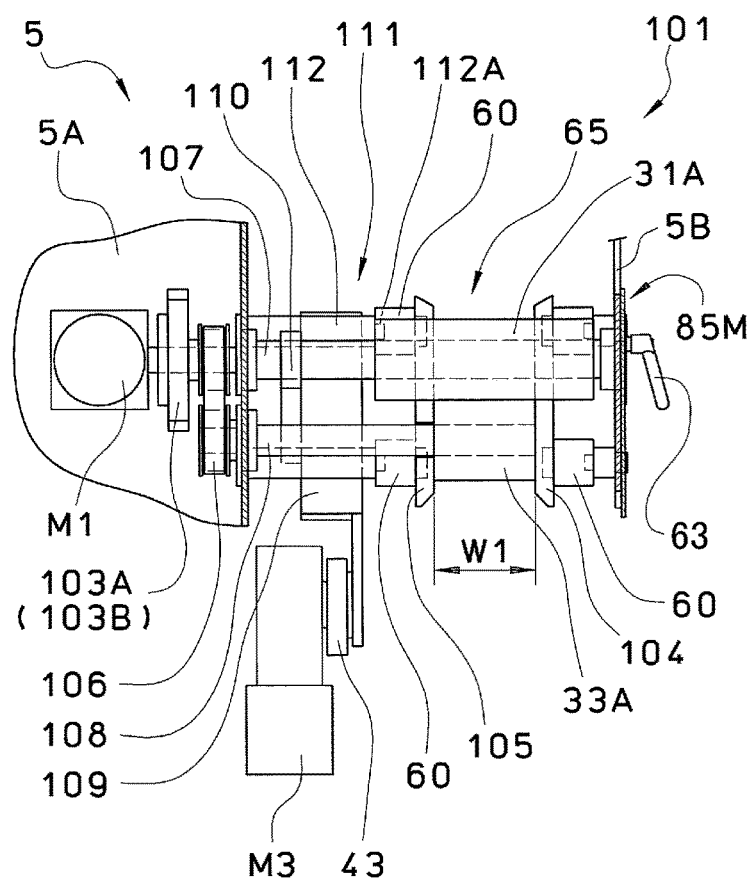
FIG. 12b is a schematically left-side view showing the main portions of the food dough forming device according to the fourth embodiment of the present invention.
Figure 12C:
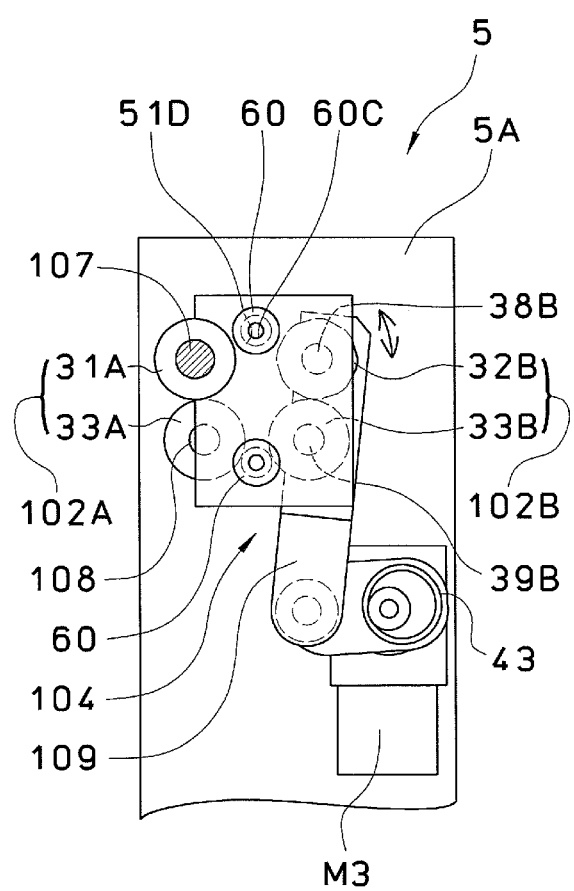
FIG. 12c is a schematically front view showing the main portions of the food dough forming device according to the fourth embodiment of the present invention.

As shown in the rear view of FIG. 12a, an upper-left side of the far-side wall plate 105 has a fitting recess 53A which is slidably fitted onto the long rotatable roller 31A. The far-side wall plate 105 includes a recessed cutout 53E below the fitting recess 53A at a position corresponding to the rotational shaft 108 of the short rotatable roller 33A. A right side of the far-side wall plate 105 also has cutouts 53D, 53F at positions corresponding to the rotational shafts 107, 108 for the short rotatable rollers 31A, 33A. Further, the far-side wall plate 105 includes apertures 53H into which the far-side holding pins 60 are fitted. The far-side wall plate 105 is supported by the far-side box-shaped frame 5A of the main body frame 5 via a support structure unit 111 which is configured to be functionally similar to the support structure unit 91 of the second embodiment. The short rotatable rollers 33A, 32B, 33B are arranged between the near-side wall plate 104 and the far-side wall plate 105 so that axial movement of the short rotatable rollers 33A, 32B, 33B is limited by the wall plates 104, 105.

The food dough forming device 101 includes a wall plate 104 and a wall plate 105 opposed to each other, the long rotatable rollers 31A and the short rotatable rollers 33A of the left roller set 102A, and a dough forming flow path 65 enclosed by the short rotatable rollers 32B and the short rotatable rollers 33B of the right roller set 102B. The right roller set 102B is allowed to be periodically reciprocated or swung around the long rotatable roller 31A, so that the dough farming flow path 65 is repeatedly enlarged and contracted. The food dough forming device 101 is allowed the food dough F, which is supplied by an appropriate means, to be flown downwardly in the dough forming flow path 65 and is discharged through a space between the lower short rotatable rollers 33A, 33B opposed to each other so that the band-like food dough F2 having an approximately constant thickness and a given width W1 can be made.

As can be seen from the above-stated explanations, also the food dough forming device 93 and the food dough forming device 101, the short rotatable rollers with different lengths and the corresponding support structure unit can be easily replaced so that the band-like food dough F2 having an approximately constant thickness and a given width W can be made.

Although it is explained in the above-stated explanations that the length of the holding pins or the support shafts defining the support structure unit are changed, the change of the lengths of the short rotatable rollers can be addressed, for example, by changing the thicknesses of the wall plates.

Further, although the outer diameters of the rotatable rollers are shown to be the same as each other in the above-stated explanations, they are not limited to that, and are arbitrarily arranged according to the feature of the food dough F and the number and positions of the rotatable rollers to be assemble.

Further, although the short rotatable rollers are explained so as to be swung around the long rotatable rollers in the above-stated explanations, the center of the swinging can be set at any positions.

Next, referring to FIGS. 13a-13c, the hopper 7 and the cutting device 9 will be explained. In the first embodiment and its first to third alternatives, the food dough forming device 3, which can change the width W of the band-like food dough F2, is explained. In this case, it is preferable that the width and the thickness of the food dough F1 to be cut by the cutting device 9 are increased or decreased according to the increase and decrease of the width W of the formed food dough F2.

Figure 13A:
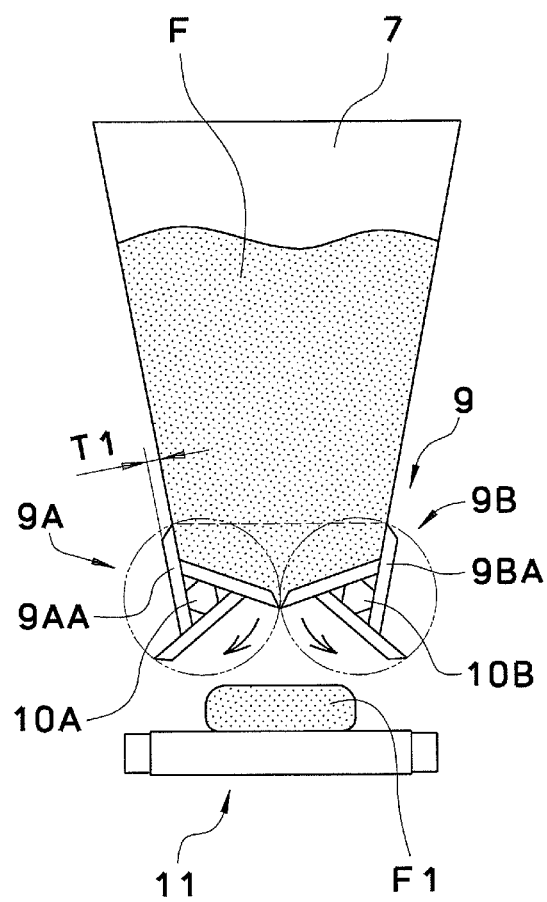
FIG. 13a is a cross sectional view of a hopper and a cutting device.

As shown in FIG. 13a, the cutting device 9 includes a pair of star cutters 9A, 9B which are disposed at the bottom of the hopper 7 and oppose to each other in the width direction. The cutting device 9 is described, for example, in the Patent Publication 4. The star cutter 9A includes three plate-like blades 9AA which are detachably attached to a rotational shaft 10a and equally spaced, for example, via an engaging mechanism, such as a dovetail groove. The blades 9AA are obliquely arranged with respect to the radial direction of the rotational shaft 10a. The star cutter 9B is symmetrical to the star cutter 9A, and three plate-like blades 9BA are detachably attached to a rotational shaft 10b. The star cutters 9A, 9B are synchronously and intermittently rotated every 120 degrees so that the food dough F1 is cut from the mass of the food dough.

Figure 13B:
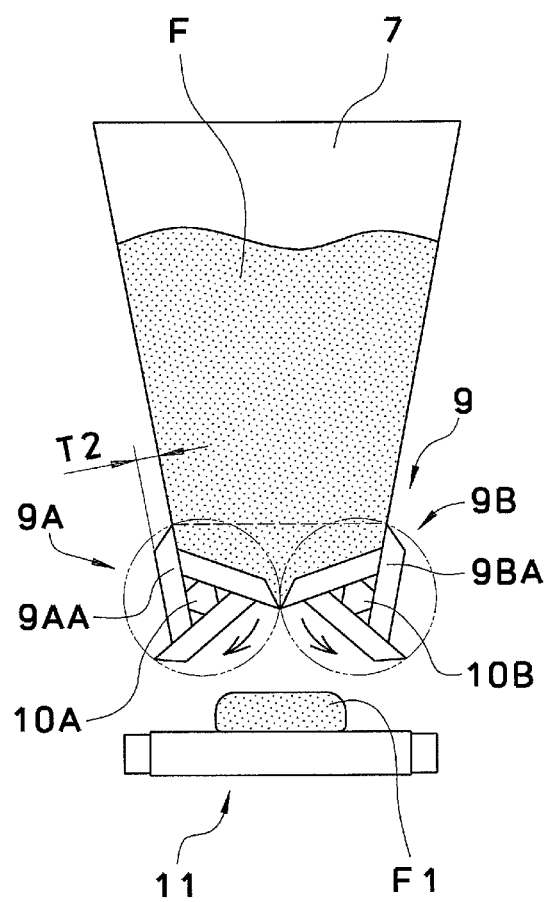
FIG. 13b is a cross sectional view of the hopper and the cutting device.

For example, when the food dough F2 is narrowed from the width W2 (see FIG. 7) to the width W1 (see FIG. 3), it is preferable that the lengths of the short rotatable rollers 32A, 32B, 33A, 32B of the food dough forming device 3 are changed and as shown in FIG. 13b, the blades 9AA, 9BA having the thickness T1 is replaced with the blades 9AB, 9BB having the thickness T2. By increasing the thickness T, the volume of the cut food dough F1 can be reduced.

Figure 13C:
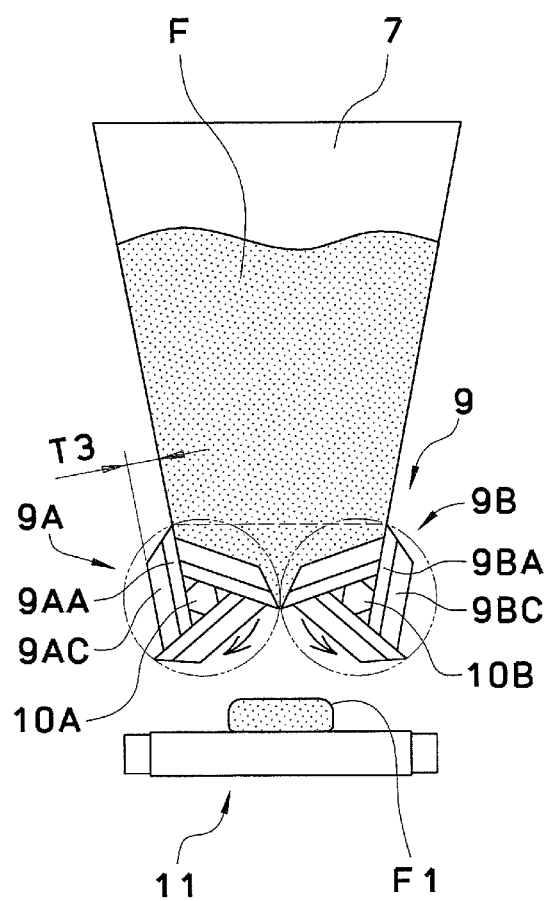
FIG. 13c is a cross sectional view of the hopper and the cutting device.

Further, when the food dough F2 is narrowed from the width W1 to the width WS, it is preferable that the short rotatable rollers 32A, 32B, 33A, 33B are replaced with those having the width WS, and as shown in FIG. 13c, the blades 9 are changed from the thickness T2 to the larger thickness T3. For example, sub-blades 9AC, 9BC having a thickness T1 are detachably fixed to the blades 9AA, 9BA in an overlapping way. By changing the thickness of the sub-blades 9AC, 9BC, the volume of the cut food dough F1 can be increased or decreased.

Figure 14A:
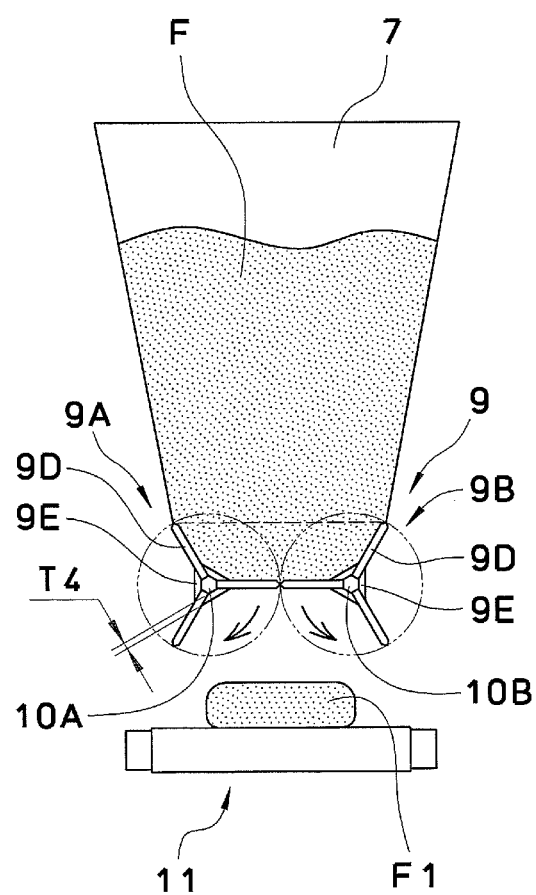
FIG. 14a is a cross-sectional view of an alternative of the hopper and the cutting device.
Figure 14B:
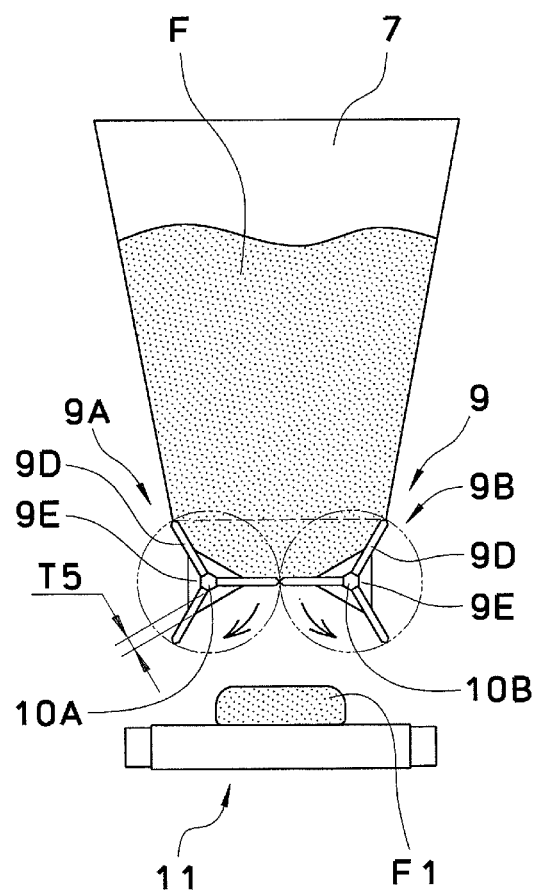
FIG. 14b is a cross-sectional view of an alternative of the hopper and the cutting device.

Further, an alternative of the cutting device 9 is shown in FIGS. 14a-14c. The star cutters 9A, 9B in this alternative include respective three plate-like blades 9D fixed to rotational shafts 10a, 10b in radial directions with equal distances. Base plates 9E are detachably attached in spaces between the blades 9D by a known engaging mechanism. The star cutters 9A, 9B are configured to be synchronously and intermittently rotated every 120 degrees so that the food dough F1 is divided from the mass of the food dough F. As shown in FIGS. 14a-14c, when the thickness of the base plates 9E are changed to be made larger to T4, T5, T6, the volume of the divided food dough F1 becomes less. Further, each of the star cutters 9A, 9B may include three or more blades.

As can be seen from the above-stated explanations, according to the width W of the food dough F2 formed by the food dough forming device 3, the components for defining the dough forming flow path 65 can be appropriately selected, and the components of the blades 9A, 9B can be appropriately selected for adjusting the volume of the food dough F1 divided by the cutting device 9. Further, the thickness of the food dough F2 formed by the food dough forming device 3 can be changed according to the fixed position of the roller set 30A. Further, the components of the blades 9A, 9B can be appropriately selected so that the volume of the divided food dough F1 is increased or decreased according to the increase or decrease of the thickness of the food dough F2.

1: food dough dividing device
3, 73, 93, 101: food dough forming device
5: main body frame 30A: (left) roller set
30B: (right) roller set
31A, 31B: long rotatable roller
32A, 32B, 33A, 33B: short rotatable roller
35A, 35B, 109: roller drive unit
51, 81, 94, 104: (nearside) wall plate
51A, 51B: fitting recess
53, 83, 95, 105: (far side) wall plate
53A, 53B: fitting recess
53C, 53D, 53E, 53F: recessed cutout
54, 60: support structure unit
55: support structure
60: holding pin
65: dough forming flow path
C1, C2: conveying direction
F, F1, F2, F3: food dough
F4: food dough piece
M1, M2, M3, M4: drive motor
W, W1, W2: width (of food dough F2)

What is claimed is:

1. A food dough forming device for forming food dough into a band-like food dough, comprising:
a main body frame,
at least two rotatable rollers comprising a long rotatable roller and a short rotatable roller having a length shorter than a length of the long rotatable roller, arranged parallel to each other,
two wall plates, including a near-side wall plate and a far-side wall plate opposed to each other in an axial direction of the rotatable rollers, and
two support structure units respectively supporting the two wall plates,
wherein a dough forming flow path is formed to be enclosed between the at least two rotatable rollers and between the two wall plates,
wherein the long rotatable roller is fixed to a long roller rotational shaft rotatably supporting the long rotatable roller, and opposite ends of the long roller rotational shaft being rotatably supported by the main body frame,
wherein the short rotatable roller is detachably fitted onto a short roller rotational shaft, and a far-side end of the short roller rotational shaft is cantilevered and rotatably supported by the main body frame or a roller drive unit attached to the long rotatable roller,
wherein the far-side wall plate of the two wall plates has a fitting recess into which an arc portion of a periphery of the long rotatable roller is fitted, and a recessed cutout at the short roller rotational shaft for the short rotatable roller, which recessed cutout is larger than a diameter of the short roller rotational shaft and smaller than an outer diameter of the short rotatable roller, the far-side wall plate being supported by a far-side support structure unit of the two support structure units, by the main body frame,
wherein the short rotatable roller is fitted onto the short roller rotational shaft to abut the far-side wall plate,
wherein the near-side wall plate of the two wall plates has a fitting recess into which the arc portion of the periphery of the long rotatable roller is fitted, the near-side wall plate being disposed to abut the short rotatable roller, and supported via a near-side support structure unit of the two support structure units, by the main body frame, and
wherein an axial movement of the short rotatable roller is limited by the two wall plates.

2. The food dough forming device according to claim 1, wherein the far-side end of the short roller rotational shaft is cantilevered and rotatably supported by the roller drive unit attached to the long rotatable roller.

3. The food dough forming device according to claim 1, wherein the far-side wall plate is detachably supported by the far-side support structure unit in a fitting way, and wherein the near-side wall plate is detachably supported by the near-side support structure unit in a fitting way.

4. The food dough forming device according to claim 1, wherein the far-side support structure unit includes a support shaft supported by the main body frame, and a holding pin connecting the support shaft with the far-side wall plate.

5. The food dough forming device according to claim 1, wherein the near-side support structure unit includes a support structure detachably attached to the main body frame, and a holding pin connecting the support structure with the near-side wall plate in a fitting way.

6. The food dough forming device according to claim 1, wherein the at least one short rotatable roller is mounted and adapted to be swung around one of the long rotatable rollers.

7. The food dough forming device according to claim 1, wherein the at least one short rotatable roller is mounted and adapted to be moved close to and away from the at least one long rotatable roller.

8. A food dough dividing device comprising:
a hopper containing a mass of the food dough;
a cutting device disposed at a bottom opening of the hopper to cut the mass of the food dough into a bar-like food dough; and
a food dough forming device according to claim 1 to form the cut bar-like food dough into a band-like food dough.

9. The food dough dividing device according to claim 8, wherein the cutting device is a star-shaped-cutter cutting device.

10. The food dough forming device according to claim 1, wherein each of the long rotatable rollers and the short rotatable rollers is a unitary roller.

* * * * *